(12) United States Patent
Sato et al.

(10) Patent No.: US 9,074,683 B2
(45) Date of Patent: Jul. 7, 2015

(54) GEAR SHIFT INDICATION DEVICE

(75) Inventors: Keita Sato, Toyota (JP); Eiji Fukushiro, Tokai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/002,222

(22) PCT Filed: Nov. 9, 2011

(86) PCT No.: PCT/JP2011/075867
§ 371 (c)(1),
(2), (4) Date: Aug. 29, 2013

(87) PCT Pub. No.: WO2013/069120
PCT Pub. Date: May 16, 2013

(65) Prior Publication Data
US 2014/0236441 A1    Aug. 21, 2014

(51) Int. Cl.
*F16H 63/42* (2006.01)
*B60K 23/00* (2006.01)
*B60W 20/00* (2006.01)
*F16H 61/02* (2006.01)

(52) U.S. Cl.
CPC ............... *F16H 63/42* (2013.01); *B60K 23/00* (2013.01); *F16H 2061/0218* (2013.01); *F16H 2061/0232* (2013.01); *F16H 2063/426* (2013.01); *Y10S 903/902* (2013.01); *B60W 20/1082* (2013.01)

(58) Field of Classification Search
USPC .................................................. 701/64; 475/5
See application file for complete search history.

(56) References Cited

U.S. PATENT DOCUMENTS

| | | | |
|---|---|---|---|
| 5,017,916 A * | 5/1991 | Londt et al. | 340/870.13 |
| 5,477,452 A * | 12/1995 | Milunas et al. | 701/1 |
| 6,985,804 B2 | 1/2006 | Minami | |
| 7,356,398 B2 * | 4/2008 | Steinmetz et al. | 701/55 |
| 8,116,971 B2 * | 2/2012 | Chen et al. | 701/123 |
| 8,587,423 B2 * | 11/2013 | Olsen et al. | 340/439 |
| 8,600,635 B2 * | 12/2013 | Wakita et al. | 701/66 |
| 2009/0075773 A1 * | 3/2009 | Martini et al. | 475/120 |

FOREIGN PATENT DOCUMENTS

| | | |
|---|---|---|
| EP | 1 386 776 A2 | 2/2004 |
| EP | 1 840 418 A1 | 10/2007 |
| JP | A-2004-60548 | 2/2004 |
| JP | A-2009-150558 | 7/2009 |
| JP | A-2010-13001 | 1/2010 |
| JP | A-2010-18256 | 1/2010 |
| WO | WO 2006/068301 A1 | 6/2006 |

* cited by examiner

*Primary Examiner* — Edwin A Young
(74) *Attorney, Agent, or Firm* — Oliff PLC

(57) ABSTRACT

In a hybrid vehicle provided with a continuously variable electric transmission mechanism capable of sequential shift mode, a minimum engine rotational speed is specified for each gear specified in the sequential shift mode so that the lower the gear, the greater the minimum engine rotational speed. When the engine rotational speed has decreased to the minimum rotational speed while driving in the sequential shift mode, an upshift lamp of a gear shift indication device is turned on to prompt the driver to manually shift to a higher gear. As the driver shifts to a higher gear in response to the prompt, the minimum engine rotational speed is specified to a lower value. That allows for further decrease of the engine rotational speed and improves fuel consumption rate.

9 Claims, 10 Drawing Sheets

(a) For Upshift Instruction (b) For Downshift Instruction

67

67

68

68

GEAR SHIFT INDICATION DEVICE

TECHNICAL FIELD

The present invention relates in general to a gear shift indication device which instructs the driver of a vehicle to shift gears and in particular to a countermeasure which enables further improvement in energy consumption rate (e.g., fuel consumption rate).

BACKGROUND ART

Gear shift indication devices (generally called gear shift indicators (GSIs)) are conventionally known as disclosed in, for example, Patent Documents 1 and 2 listed below. In a vehicle equipped with a manual transmission, when a gear is being selected which is different from a suitable gear determined from engine load, vehicle speed, and other driving conditions (e.g., a gear capable of improvement in fuel consumption rate), the gear shift indication device recommends the driver to shift to the suitable gear.

This kind of gear shift indication device is applicable not only to vehicles with a typical manual transmission, but also to vehicles with an automatic transmission capable of sequential shift mode (manual gear shift mode) disclosed in Patent Document 3 listed below and to hybrid vehicles with a continuously variable electric transmission mechanism capable of sequential shift mode disclosed in Patent Documents 4 and 5 listed below.

The following will describe an example where a gear shift indication device is applied to a hybrid vehicle.

A known powertrain used in a hybrid vehicle of the above kind may be made of an engine, a first and a second electric motor (motor generator), and a planetary gear train which is part of a power split mechanism, as disclosed in Patent Documents 4 and 5. Specifically, the engine crankshaft is connected to a planetary carrier in the power split mechanism, the first electric motor (first motor generator MG1) is connected to the sun gear, and the second electric motor (second motor generator MG2) is connected to the ring gear via a reduction mechanism (which is made of, for example, the planetary gear train). Drive wheels are connected to the ring gear via a speed reducer and a differential gear set for power transfer.

Accordingly, during regular travel, the driving force (torque) input from the engine to the planetary carrier is split between the ring gear (for drive wheels) and the sun gear (for the first electric motor). The torque split for the ring gear drives the drive wheels as a direct torque (a torque directly transferred from the engine to the drive wheels). On the other hand, the torque split for the sun gear is transferred to the first electric motor so that the first electric motor can generate electric power which in turn drives the second electric motor (generates torque) for assist torque for the drive wheels.

As described above, the power split mechanism functions as a differential mechanism, and the differential operation enables a function as a transmission (continuously variable electric transmission) capable of electrically changing the gear ratio. As a result, a driving force necessary for the drive wheels is achieved, and at the same time, an engine operation state optimized for fuel consumption rate (an operation state on an optimal fuel efficiency operating line detailed later) is obtained.

When the driver operates the shift lever for gear shifting in sequential shift mode in a hybrid vehicle equipped with a gear shift indication device, for example, the rotational speed of the first electric motor is controlled, and a target rotational speed of the engine is adjusted to realize a gear ratio (a gear ratio that equals the ratio of the rotational speed of the engine to the rotational speed of the transmission output shaft) with the operating gears.

In addition, in this kind of hybrid vehicle, a minimum rotational speed for the engine is specified for each gear specified in sequential shift mode. This is to produce a sufficient braking force by restricting decreases of the rotational speed of the engine when, for example, the accelerator opening degree is low or the accelerator is off, and engine friction is utilized so that its resistance can act as engine brake (braking force on the drive wheels). Accordingly, engine brake that is equivalent to the engine brake in a vehicle equipped with a manual transmission can be simulated in a hybrid vehicle. In addition, if the engine brake is effectively used when, for example, driving down a slope, the maneuverability of a vehicle equipped with a manual transmission can be simulated. In this manner, the minimum rotational speed for the engine is specified increasingly high for gears with higher gear ratios (for lower gears) to simulate engine brake that is equivalent to the engine brake in a vehicle equipped with a manual transmission.

CITATION LIST

Patent Document

Patent Document 1: Japanese Patent Application Publication, Tokukai, No. 2004-60548 A
Patent Document 2: PCT International Application Publication, No. WO2006/68301
Patent Document 3: Japanese Patent Application Publication, Tokukai, No. 2009-150558 A
Patent Document 4: Japanese Patent Application Publication, Tokukai, No. 2010-18256 A
Patent Document 5: Japanese Patent Application Publication, Tokukai, No. 2010-13001 A

SUMMARY OF THE INVENTION

Technical Problem

Nevertheless, when a minimum rotational speed for the engine is specified for each gear as described above, especially when a gear whose gear ratio is high is being selected, improvement in fuel consumption rate is limited because the rotational speed of the engine is maintained relatively high. Considering the fuel consumption rate, the engine operating point is preferably specified on the optimal fuel efficiency operating line as described above. Since a minimum rotational speed is specified for the rotational speed of the engine, however, the engine operating point can only be changed to approach the optimal fuel efficiency operating line in a limited manner.

Similar problems arise if a motor is used as a driving force source in place of the engine (e.g., in the case of an electric car). Specifically, a minimum rotational speed for the motor is specified in accordance with the gear, and friction in motor rotation is utilized to power engine brake, the rotational speed of the motor again cannot be lowered below the minimum rotational speed, which places limitations on improvement in energy consumption rate.

The present invention, conceived in view of these problems, has an object of providing a gear shift indication device which enables further improvement in energy consumption rate in a vehicle capable of shifting gears in sequential shift mode.

Solution to Problem

Principles in Solving the Problems of the Invention

The principles in solving the problems of the present invention to achieve the object are to give an upshift instruction to the driver if the rotational speed of a driving force source (e.g., engine) decreases to a predetermined minimum rotational speed while the driving force source is running in sequential shift mode (manual gear shift mode). Thus, the driver is prompted to shift to a gear which allows for decreases in the rotational speed of the driving force source in order to improve the energy consumption rate.

Means to Solve Problems

Specifically, the present invention is a gear shift indication device applied to a vehicle provided with a driving force transfer system capable of transfer of a driving force from a driving force source to drive wheels and also capable of manual gear selection, the indication device prompting a driver to shift gears; the driving force source having a minimum rotational speed specified for each gear; if the driving force source will likely have a rotational speed decreasing below a current minimum rotational speed, the indication device prompting the driver to shift to a gear which allows for a minimum rotational speed lower than the current minimum rotational speed.

The "gear" in the present invention is defined as the "operation state which can be altered by a manual manipulation by the driver." Specifically, the "gear" in the present invention encompasses the fixed gear ratios for the individual gears and those gear ratios which may vary within a range for the individual gears. This "range" refers, for example, to a linear range for automatic gear shifting or a stepped range for stepped gear shifting and range hold ("range hold" will be detailed later). Some vehicles provide a range for increasing the braking force of engine brake (engine brake range; B range). The "gear" in range hold conceptually encompasses this "B range."

According to the above features, if the rotational speed of the driving force source will likely decrease below the current minimum rotational speed when a gear is being manually selected in a driving force transfer system, the driver is prompted to shift to a gear which allows for a minimum rotational speed lower than the current minimum rotational speed. If the driver shifts gears in response to the prompt, the driving force source is allowed a minimum rotational speed lower than the current minimum rotational speed. The driving force source is thus allowed to decrease its rotational speed. In other words, it is now possible to decrease the minimum rotational speed for the driving force source which has had restrictions under the pre-shifting gear, hence to run the driving force source at a high efficiency rotational speed. That improves the energy consumption rate of the driving force source. For example, if the driving force source is an internal combustion engine, it is possible to move the operating point closer to an optimal fuel efficiency operating point.

More specifically, the driving force transfer system is capable of shifting gears in automatic gear shift mode and manual gear shift mode. When that is the case, in the manual gear shift mode, if the driving force source will likely have a rotational speed decreasing below the current minimum rotational speed, the indication device prompts the driver to shift to a gear which allows for a minimum rotational speed lower than the current minimum rotational speed.

The automatic gear shift mode here refers, for example, to when the shift lever is in the drive position (D) as a result of a manipulation. The manual gear shift mode here refers, for example, to when the shift lever is in the sequential position (S) as a result of a manipulation. If the range positions include "2 (second)," "3 (third)," etc., the manual gear shift mode also refers to when the shift lever are in one of these "2 (second)" and "3 (third)" range positions as a result of a manipulation.

In a driving force transfer system capable of shifting gears in the automatic gear shift mode and the manual gear shift mode, a minimum rotational speed may be specified for the driving force source in the manual gear shift mode so that the friction caused by the rotation of the driving force source can be utilized so as to enable resistance to act as an braking force on the drive wheels (so-called engine brake). By specifying a braking force with different properties for each gear, a braking force can be simulated which is equivalent to the braking force in a vehicle equipped with a manual transmission. When the minimum rotational speed for the driving force source is specified for such a purpose, the restrictions on the minimum rotational speed can be eliminated, enabling improvement of the energy consumption rate, if the driver shifts gears as the driver is prompted to do according to the means to solve problems of the present invention. In addition, the driver is not prompted to shift gears until the rotational speed of the driving force source approaches the minimum rotational speed. Therefore, if it is desirable to shift to a different gear for an improved fuel consumption rate, the driver is prompted to shift gears while achieving as much of the performance (for example, response and braking) available with the gear being manually selected by the driver as possible. Hence, high performance is ensured, and the fuel consumption rate is improved.

More specifically, if the rotational speed of the driving force source has decreased to the minimum rotational speed or has so decreased that a deviation of the rotational speed of the driving force source from the minimum rotational speed is less than or equal to a predetermined value, it is determined that the driving force source will likely have a rotational speed decreasing below the current minimum rotational speed.

Especially, if the driver is prompted to shift to a gear which allows for a minimum rotational speed lower than the current minimum rotational speed when the rotational speed of the driving force source has so decreased that the deviation of the rotational speed from the minimum rotational speed is less than or equal to a predetermined value, it is possible to optimize the timing at which the driver actually shifts gears after the driver is prompted to do so.

Whether the driving force source will likely have a rotational speed decreasing below the current minimum rotational speed may be determined from a rate of decrease of the rotational speed of the driving force source or may be predicted from the relationship between the amount of depression of the accelerator pedal and vehicle speed. Various other methods are also possible.

Examples of conditions for not prompting the driver to shift gears (hereinafter, the action of prompting the driver to shift gears may be referred to as a "gear shift instruction") may include the following. If high rotational speed control in which a high rotational speed is specified for the driving force source is being carried out or if, upon shifting to a higher gear while the high rotational speed control is being carried out, the rotational speed of the driving force source will likely be below a required rotational speed for the driving force source under the high rotational speed control, the indication device does not prompt the driver to shift gears.

This arrangement prevents the high rotational speed control from being disabled by the rotational speed of the driving force source decreasing, as a result of shifting to a higher gear, below the rotational speed required in the high rotational speed control. In other words, priority is given to the effects which should be achieved by the high rotational speed control (e.g., the catalyst should be warmed up quickly (detailed later)) rather than improvement of the energy consumption rate via gear shifting.

Specifically, the high rotational speed control:

(a) in the case of the driving force source being an internal combustion engine, specifies a high rotational speed for the internal combustion engine to warm up catalyst in an exhaust system;

(b) specifies a high rotational speed for the driving force source to reduce unwanted noise and vibration in the driving force source or the driving force transfer system;

(c) specifies a high rotational speed for the driving force source to reduce unwanted noise produced by gear teeth colliding each other due to loose engagement of gear teeth in the driving force transfer system;

(d) specifies a high rotational speed for the driving force source to maintain reacceleratability of the vehicle;

(e) specifies a high rotational speed for the driving force source in response to a request for interior air heating;

(f) specifies a high rotational speed for the driving force source because of a restriction on a maximum allowable torque of the driving force source;

(g) in the case of the driving force source being an internal combustion engine and an electric motor, specifies a high rotational speed for the internal combustion engine because of a restriction on a maximum rotational speed of the electric motor;

(h) in the case of the driving force source being an internal combustion engine and an electric motor, specifies a high rotational speed for the internal combustion engine in response to a malfunction of the electric motor;

(i) in the case of the driving force source being an internal combustion engine and a motor generator, specifies a high rotational speed for the internal combustion engine to eliminate a negative torque occurring in the motor generator;

(j) in the case of the driving force source being an internal combustion engine, specifies a high rotational speed for the internal combustion engine to maintain an oil pressure of engine oil by means of the driving force of the internal combustion engine;

(k) in the case of the driving force source being an internal combustion engine and an electric motor, transfers a rotational force of the electric motor to the internal combustion engine because of an insufficient output of the internal combustion engine to adjust the rotational speed of the internal combustion engine by means of the rotational force of the electric motor.

Preferably, even if the driving force source will likely have a rotational speed decreasing below the current minimum rotational speed, the indication device does not prompt the driver to shift gears if a difference between the current minimum rotational speed and a minimum rotational speed for the driving force source for a gear to which the driver would shift if being prompted to do so is less than or equal to a predetermined value (the difference is of such a value that the energy consumption rate cannot be sufficiently improved).

Gear shifting and resultant allowing of the rotational speed of the driving force source to decrease hardly improves the energy consumption rate and only ends up placing additional workload on the driver if the pre-shifting minimum rotational speed for the driving force source matches the post-shifting minimum rotational speed for the driving force source or if the difference between the minimum rotational speeds is small. Therefore, in these situations, the driver is not prompted to shift gears. The driver is prompted to shift gears only when the energy consumption rate is greatly improved.

Preferably, if the vehicle is provided with an electric power generator which receives a driving force from the driving force source for generation of electric power and an electric storage device which stores the electric power generated by the electric power generator, when the electric storage device has a temperature which is below or equal to a predetermined value (the temperature is of such a value that the maximum and minimum voltages are severely restricted by rising internal resistance of the electric storage device), the indication device does not prompt the driver to shift gears.

When the temperature of the electric storage device is below or equal to a predetermined value, the maximum and minimum voltages are restricted by rising internal resistance of the electric storage device and other factors. Therefore, the driver is not prompted to shift gears, in order to prevent the change of the rotation of the driving force source from causing excessive electric power generation by the electric power generator.

A specific example of the driving force transfer system capable of gear shifting in the automatic gear shift mode and the manual gear shift mode is a continuously variable transmission mechanism capable of continuously variable gear ratio. The continuously variable transmission mechanism allows for switching between multiple gear ratios in the manual gear shift mode.

A specific configuration in the case of the vehicle being a hybrid vehicle is such that the driving force source is an internal combustion engine, the driving force transfer system includes a power split mechanism comprising a planetary gear train including: a planetary carrier connected to an output shaft of the internal combustion engine; a sun gear connected to a first electric motor; and a ring gear connected to a second electric motor, and the driving force transfer system is capable of variable gear ratio by altering a rotational speed of the internal combustion engine through control of a rotational speed of the first electric motor.

The following is another configuration to achieve the object.

The present invention is a gear shift indication device applied to a vehicle provided with a driving force transfer system capable of transfer of a driving force from a driving force source to drive wheels and also capable of manual gear selection, the indication device prompting a driver to shift gears; the driving force source having a minimum rotational speed specified for each gear; if there is less fuel consumption at a rotational speed lower than a current minimum rotational speed for the driving force source, the indication device, in realizing a driving force required by the driver, prompting the driver to shift to a gear which allows for a minimum rotational speed lower than the current minimum rotational speed.

According to these features, if there is less fuel consumption at a rotational speed lower than a current minimum rotational speed for the driving force source, the indication device, in realizing a driving force required by the driver, prompts the driver to shift gears (to a gear which allows for a minimum rotational speed lower than the current minimum rotational speed). On the other hand, if there is more fuel consumption at a rotational speed lower than the current minimum rotational speed for the driving force source, the indication device does not prompt the driver to shift gears. Consequently, if the driver shift gears in response to the gear shift instruction, the gears are always shifted to a gear where there will be less fuel consumption, which certainly improves fuel consumption rate.

More specifically, if there is less fuel consumption at a rotational speed lower than a current minimum rotational speed for the driving force source, the indication device, in realizing a driving force required by the driver, prompts the driver to shift to a gear which allows for a minimum rotational speed lower than the current minimum rotational speed when the rotational speed of the driving force source has decreased to the minimum rotational speed or has so decreased that a deviation of the rotational speed from the minimum rotational speed is less than or equal to a predetermined value.

When that is the case, especially, if the driver is prompted to shift to a gear which allows for a minimum rotational speed lower than the current minimum rotational speed when the rotational speed of the driving force source has so decreased that the deviation of the rotational speed from the minimum rotational speed is less than or equal to a predetermined value, it is again possible to optimize the timing at which the driver actually shifts gears after the driver is prompted to do so.

As described above, if there is less fuel consumption at a rotational speed lower than a current minimum rotational speed for the driving force source, the indication device, in realizing a driving force required by the driver, prompts the driver to shift to a gear which allows for a minimum rotational speed lower than the current minimum rotational speed and may:

(A) in manual gear shift mode, prompt the driver to shift to a gear which allows for a minimum rotational speed lower than the current minimum rotational speed if the rotational speed of the driving force source will likely decrease below the current minimum rotational speed, (B) not prompt the driver to shift gears if high rotational speed control in which a high rotational speed is specified for the driving force source is being carried out or if, upon shifting to a higher gear while the high rotational speed control is being carried out, the rotational speed of the driving force source will likely be below a required rotational speed for the driving force source under the high rotational speed control, or (C) even if the driving force source will likely have a rotational speed decreasing below the current minimum rotational speed, not prompt the driver to shift gears if a difference between the current minimum rotational speed and a minimum rotational speed for the driving force source for a gear to which the driver would shift if being prompted to do so is less than or equal to a predetermined value, or (D) if the vehicle is provided with an electric power generator which receives a driving force from the driving force source for generation of electric power and an electric storage device which stores the electric power generated by the electric power generator, when the electric storage device has a temperature which is below or equal to a predetermined value, not prompt the driver to shift gears.

When that is the case, the high rotational speed control may implement (a) to (k) listed above.

Advantageous Effects of the Invention

In the present invention, the driver is prompted to shift to a gear which allows for a minimum rotational speed lower than the current minimum rotational speed if the driving force source will likely have a rotational speed decreasing below the current minimum rotational speed while running a driving force source. Accordingly, if the driver shifts gears in response to an instruction to do so, the rotational speed of the driving force source is allowed to decrease while improving the energy consumption rate.

DESCRIPTION OF EMBODIMENTS

The following will describe embodiments of the present invention in reference to drawings. The present embodiment will illustrate the present invention being applied to a FF (front engine, front wheel drive) hybrid vehicle.

Figure 1:
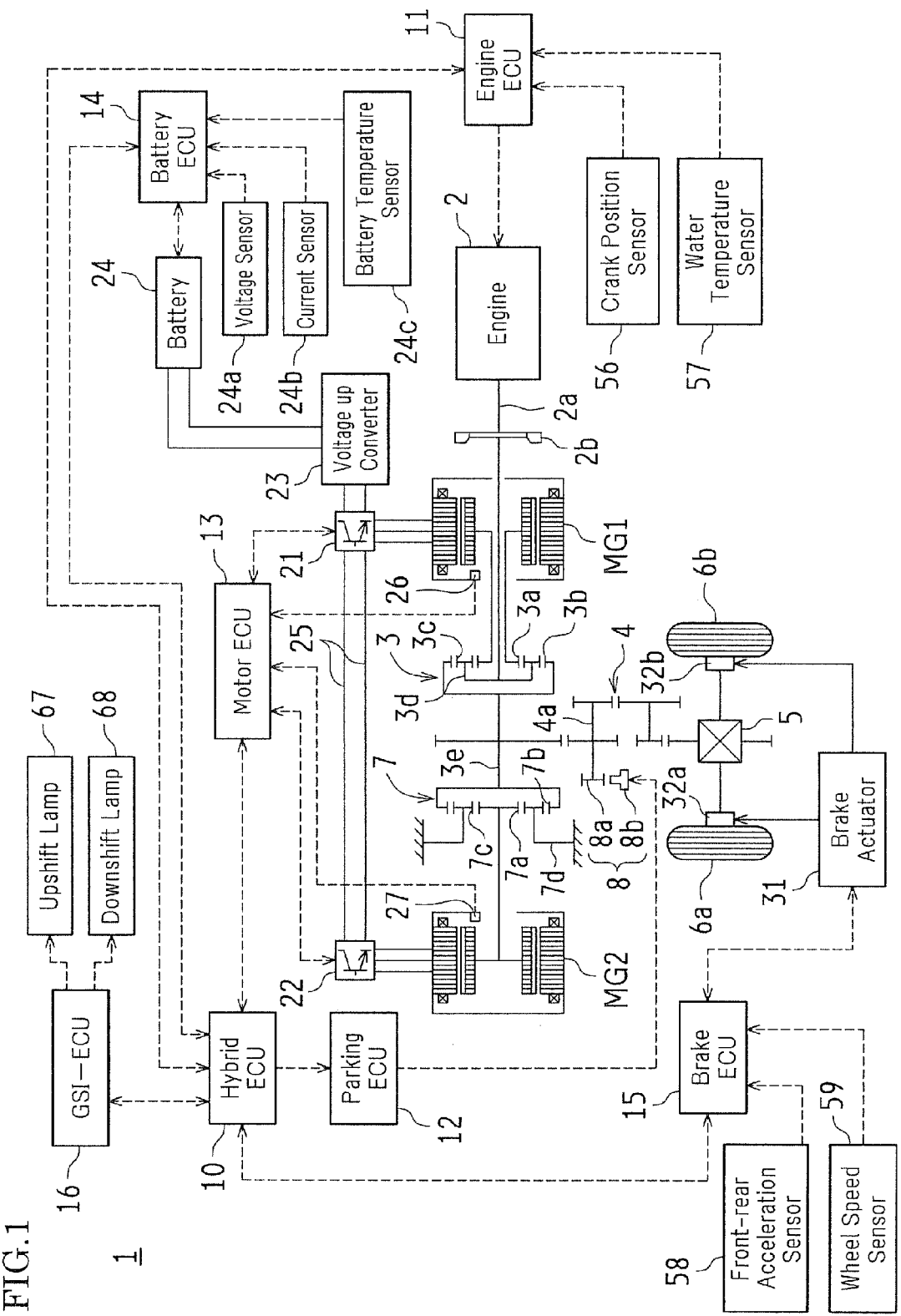
FIG. 1 is a diagram schematically showing a configuration of a hybrid vehicle in accordance with an embodiment.

FIG. 1 is a diagram schematically showing a configuration of a hybrid vehicle 1 in accordance with the present embodiment. As illustrated in FIG. 1, the hybrid vehicle 1 includes: an engine 2 as a drive system for transferring a driving force to front wheels (drive wheels) 6a and 6b; a 3-shaft power split mechanism 3 connected via a damper 2b to a crankshaft 2a as an output shaft for the engine 2; a first motor generator MG1, capable of electric power generation, which is connected to the power split mechanism 3; and a second motor generator MG2 connected via a reduction mechanism 7 to a ring gear shaft 3e as a drive shaft connected to the power split mechanism 3. These crankshaft 2a, power split mechanism 3, first motor generator MG1, second motor generator MG2, reduction mechanism 7, and ring gear shaft 3e form a driving force transfer system for the present invention.

The ring gear shaft 3e is connected to the front wheels 6a and 6b via a gear mechanism 4 and a front wheel differential gear set 5.

The hybrid vehicle 1 further includes an electronic control unit 10 for a hybrid system (hereinafter, will be referred to as a hybrid ECU (electronic control unit)) which controls the vehicle's entire drive system.

Engine 2 and Engine ECU 11

The engine 2 is an internal combustion engine which relies on a hydrocarbon fuel, such as gasoline or diesel fuel, for power output. The operation of the engine 2 is controlled (fuel injection control, ignition control, intake air volume adjustment control, etc.) by an electronic control unit 11 for an engine (hereinafter, will be referred to as an engine ECU) which receives signal inputs from various sensors monitoring the operation state of the engine 2. The engine ECU 11 communicates with the hybrid ECU 10 so that it can control the operation of the engine 2 based on control signals supplied from the hybrid ECU 10 and feed data related to the operation state of the engine 2 to the hybrid ECU 10 when necessary. The engine ECU 11 is connected to, for example, a crank position sensor 56 and a water temperature sensor 57. The crank position sensor 56 outputs a detection signal (pulse) every time the crankshaft 2a rotates a predetermined angle. The engine ECU 11 computes the rotational speed Ne of the engine based on the signal output from the crank position sensor 56. The water temperature sensor 57 outputs a detection signal in accordance with a cooling water temperature in the engine 2.

Power Split Mechanism 3

The power split mechanism 3 includes a sun gear 3a which is an external gear, a ring gear 3b which is an internal gear disposed concentrically with the sun gear 3a, multiple pinion gears 3c engaging both the sun gear 3a and the ring gear 3b, and a carrier 3d holding the pinion gears 3c in such a manner that the pinion gears 3c can freely self-rotate and rotate around the sun gear 3a. The power split mechanism 3 forms a planetary gear train composed of the sun gear 3a, the ring gear 3b, and the carrier 3d as rotatory elements to implement differential operation. In the power split mechanism 3, the crankshaft 2a of the engine 2 is connected to the carrier 3d, the rotor of the first motor generator MG1 is connected to the sun gear 3a, and the reduction mechanism 7 is connected to the ring gear 3b via the ring gear shaft 3e.

When the first motor generator MG1 functions as an electric power generator, the driving force produced by the engine 2 is transferred via the carrier 3d and split between the sun gear 3a and the ring gear 3b in accordance with their gear ratio. Meanwhile, when a request is made to start the engine 2, the first motor generator MG1 functions as an electric motor (starter motor), and the driving force produced by the first motor generator MG1 is transferred to the crankshaft 2a via the sun gear 3a and the carrier 3d in order to crank up the engine 2.

Reduction Mechanism 7

The reduction mechanism 7 includes a sun gear 7a which is an external gear, a ring gear 7b which is an internal gear disposed concentrically with the sun gear 7a, multiple pinion gears 7c engaging both the sun gear 7a and the ring gear 7b, and a carrier 7d holding the pinion gears 7c in such a manner that the pinion gears 7c can freely self-rotate. In the reduction mechanism 7, the carrier 7d is fixed to a transmission case. Meanwhile, the sun gear 7a is connected to the rotor of the second motor generator MG2, and the ring gear 7b is connected to the ring gear shaft 3e.

Parking Lock Mechanism 8 and Parking ECU 12

The gear mechanism 4 is provided with a parking lock mechanism 8 which includes a parking gear 8a connected to a gear shaft 4a and a parking lock pole 8b engaging and locking the parking gear 8a from rotating. The parking lock pole 8b is actuated by a parking actuator (not shown) being driven under the control of the parking ECU 12. The parking ECU 12 communicates with the hybrid ECU 10 so that it can receive instruction signals supplied from the hybrid ECU 10 to control the parking actuator. Specifically, if a gear shift device 9 (see FIG. 2) is manipulated to shift from a non-parking position to the parking position (P position), the parking actuator is activated in accordance with a lock instruction signal from the parking ECU 12, which in turn causes the parking lock pole 8b to engage the parking gear 8a so as to indirectly lock the front wheels 6a and 6b. On the other hand, if the gear shift device 9 is manipulated to shift from the parking position to a non-parking position, the parking actuator is activated in accordance with a lock release instruction signal from the parking ECU 12, which in turn causes the parking lock pole 8b to disengage the parking gear 8a to release the locking of the front wheels 6a and 6b.

Gear Shift Device 9 and Gear Shift Mode

Figure 2:
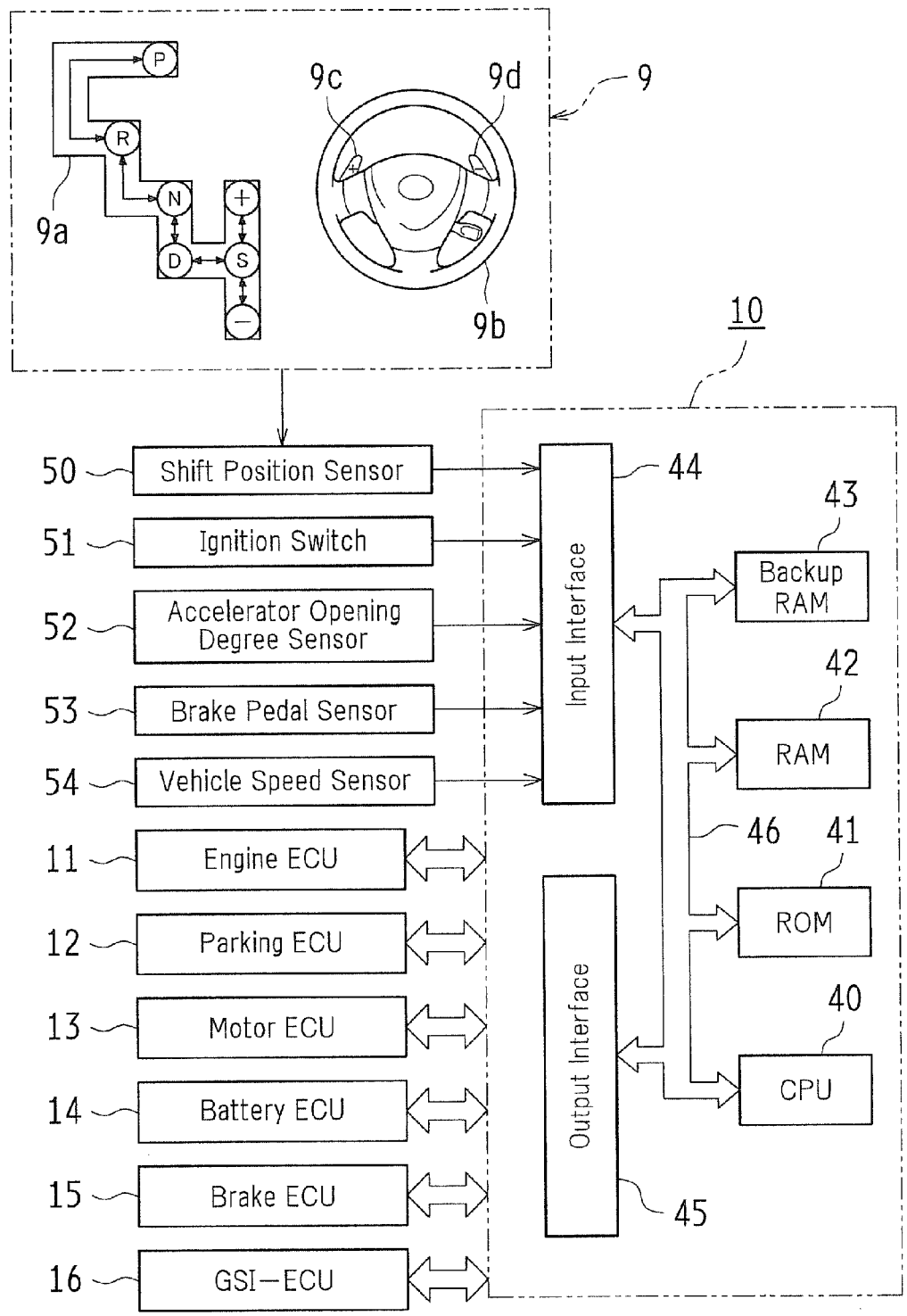
FIG. 2 is a block diagram schematically showing a configuration of a control system for a hybrid vehicle.

The gear shift device 9 will now be described. The gear shift device 9 is disposed near the driver's seat and provided with a shift lever (sometimes referred to as a shift knob or a selector lever) (not shown) capable of shifting motion. The gear shift device 9 has formed therein a shift gate 9a which indicates a parking position (P), a reverse position (R), a neutral position (N), a drive position (D), and a sequential position (S) as illustrated in FIG. 2, so that the driver can move the shift lever to a desired range position. These range positions, i.e., parking (P), reverse (R), neutral (N), drive (D), and sequential (S) as well as "+" and "−" detailed below, are detected by a shift position sensor 50.

When the shift lever is in the drive position (D), the hybrid system operates in automatic gear shift mode in which continuously variable electric gear control is carried out to control the gear ratio so that the operating point of the engine 2 lies on an optimal fuel efficiency operating line (detailed later).

On the other hand, when the shift lever is in the sequential position (S), the hybrid system operates in manual gear shift mode (sequential shift mode). There are provided a "+" position and a "−" position in front of and behind the sequential position (S) respectively. The shift lever is moved into the "+" position when manually shifting to a higher gear (upshifting) and into the "−" position when manually shifting to a lower gear (downshifting). If the shift lever is manually moved (manipulated for gear shifting) from the sequential position (S) (neutral position) to the "+" or "−" position, the hybrid system implements simulated gear shifting (e.g., gear shifting realized by adjusting the rotational speed of the engine through control of the first motor generator MG1) to shift to a higher or lower gear. Specifically, every time the driver moves the shift lever into the "+" position, the driver can select a next higher gear (e.g., from first to second to third to fourth). On the other hand, every time the driver moves the shift lever into the "−" position, the driver can select a next lower gear (e.g., from fourth to third to second to first). The number of selectable gears in the manual gear shift mode is by no means limited to 4 and may be any other suitable number (e.g., 6 or 8 gears).

The manual gear shift mode in the present invention is not limited to when the shift lever is positioned at the sequential position (S) as described above, but also encompasses when the shift lever is manually moved into, if any, second, third, or other range position. For example, if the shift lever is manipulated from the drive position (D) to the third position, the hybrid system switches from the automatic gear shift mode to the manual gear shift mode.

An upshift paddle switch 9c and a downshift paddle switch 9d are disposed on a steering wheel 9b located in front of the driver's seat. The paddle switches 9c and 9d are shaped like a lever. In the manual gear shift mode, the upshift paddle switch 9c is used to output an instruction signal for an upshift request, and the downshift paddle switch 9d is used to output an instruction signal for a downshift request. The upshift paddle switch 9c bears a "+" sign, and the downshift paddle switch 9d bears a "−" sign.

If the shift lever has been manipulated into the sequential position (S), and the manual gear shift mode is turned on, the gears are shifted to a next higher gear every time the upshift paddle switch 9c is operated (pulled out), whereas the gears are shifted to a next lower gear every time the downshift paddle switch 9d is operated (pulled out).

In this manner, if the shift lever is manipulated into the drive position (D) to turn on the automatic gear shift mode in the hybrid system of the present embodiment, the engine 2 is controlled to achieve efficient operation. Specifically, the hybrid system is controlled so that the operating point of the engine 2 lies on the optimal fuel efficiency line. Meanwhile, if the shift lever is manipulated into the sequential position (S) to turn on the manual gear shift mode, the gear ratio, which is the ratio of the rotational speed of the engine 2 to the rotational speed of the ring gear shaft 3e, can be altered between, for example, four values (first to fourth) in response to a gear shifting operation by the driver.

Motor Generators MG1 and MG2 and Motor ECU 13

The motor generators MG1 and MG2 are each composed of a well-known synchronous motor generator capable of being driven as an electric power generator and as an electric motor and exchange electric power with a battery (electric storage device) 24 via inverters 21 and 22 and a voltage up converter 23. Electric power lines 25, connecting the inverters 21 and 22, the voltage up converter 23, and the battery 24 with each other, are arranged as common positive and negative buses for the inverters 21 and 22 so that the electric power generated by either one of the motor generators MG1 and MG2 can be consumed by the other motor. Therefore, the battery 24 is charged and discharged due to the electric power generated or consumed by either one of the motor generators MG1 and MG2. When the electric power generated and consumed by the motor generators MG1 and MG2 is balanced, the battery 24 is neither charged nor discharged.

The motor generators MG1 and MG2 are driven under the control of an electronic control unit 13 for an electric motor (hereinafter, will be referred to as a motor ECU). The motor ECU 13 is fed with signals which are necessary to control the driving of the motor generators MG1 and MG2, such as signals supplied from rotational position sensors 26 and 27 which detect the rotational positions of the rotors of the motor generators MG1 and MG2 and a phase current detected by a current sensor and applied to the motor generators MG1 and MG2. The motor ECU 13 outputs switching control signals to the inverters 21 and 22. For example, under the control of the motor ECU 13, either one of the motor generators MG1 and MG2 is driven as an electric power generator (e.g., the second motor generator MG2 is controlled to regenerate electric power) or as an electric motor (e.g., the second motor generator MG2 is controlled to move the vehicle). The motor ECU 13 communicates with the hybrid ECU 10 so that it can control the driving of the motor generators MG1 and MG2 as described above in accordance with control signals supplied from the hybrid ECU 10 and feed data related to the operation state of the motor generators MG1 and MG2 to the hybrid ECU 10 when necessary Battery 24 and Battery ECU 14

The battery 24 is managed by an electronic control unit 14 for a battery (hereinafter, will be referred to as a battery ECU). The battery ECU 14 is fed with signals which are necessary to manage the battery 24, such as a terminal-to-terminal voltage detected by a voltage sensor 24a disposed between the terminals of the battery 24, a charge/discharge current detected by current sensors 24b attached to the electric power lines 25 connected to the output terminal of the battery 24, and a battery temperature Tb detected by a battery temperature sensor 24c attached to the battery 24. The battery ECU 14 communicates with the hybrid ECU 10 so that it can feed data related to the state of the battery 24 to the hybrid ECU 10 when necessary.

The battery ECU 14 computes remaining electric power (state of charge, or SOC) based on the integral of the charge/discharge current detected by the current sensor 24b to manage the battery 24. The battery ECU 14 also computes, based on the computed remaining electric power (SOC) and the battery temperature Tb detected by the battery temperature sensor 24c, input/output limits Win and Wout which are maximum allowable electric powers with which the battery 24 may be charged and discharged. The input/output limits Win and Wout for the battery 24 may be specified by specifying basic values for the input/output limits Win and Wout based on the battery temperature Tb, specifying an output limit correction coefficient and an input limit correction coefficient based on the remaining electric power (SOC) of the battery 24, and multiplying the basic values which have been specified for the input/output limits Win and Wout by the correction coefficient.

Braking Device and Brake ECU 15

The front wheels 6a and 6b are provided with oil pressure brakes 32a and 32b which are powered by the oil pressure created by a brake actuator 31. The oil pressure created by the brake actuator 31 is adjusted under the drive control of the brake ECU 15. These brake ECU 15, brake actuator 31, and oil pressure brakes 32a and 32b form a braking device.

The brake ECU 15 is connected to a front-rear acceleration sensor (G sensor) 58 and wheel speed sensors 59 among others. The front-rear acceleration sensor 58 detects the acceleration in the vehicle's front-rear direction to obtain the vehicle's acceleration/deceleration, a road surface slope, etc. The wheel speed sensors 59 are disposed on the wheels 6a and 6b respectively to obtain the rotational speeds of the wheels 6a and 6b. The brake ECU 15 supplies a drive signal to the brake actuator 31. The brake ECU 15 communicates with the hybrid ECU 10 so that it can control the driving of the brake actuator 31 based on a control signal from the hybrid ECU 10 and supply data related to the state of the brake actuator 31 and the state of the front wheels 6a and 6b to the hybrid ECU 10 when necessary.

Hybrid ECU 10 and Control System

The hybrid ECU 10 includes a CPU 40, a ROM 41, a RAM 42, a backup RAM 43, etc. as illustrated in FIG. 2. The ROM 41 stores various control programs and maps referenced in executing the various control programs. The CPU 40 executes various computing processes based on the various control programs and maps stored in the ROM 41. The RAM 42 is a memory which temporarily stores results of computation by the CPU 40 and data supplied from sensors. The backup RAM 43 is a non-volatile memory which stores, for example, data which needs to be stored when the ignition is turned off.

The CPU 40, ROM 41, RAM 42, and backup RAM 43 are connected with each other via a bus 46 and also connected to an input interface 44 and an output interface 45.

The input interface 44 is connected, for example, to the shift position sensor 50, an ignition switch 51 which sends an ignition signal in response to a turn-on operation by the driver, an accelerator opening degree sensor 52 which outputs a signal corresponding to the amount of depression of the accelerator pedal, a brake pedal sensor 53 which outputs a signal corresponding to the amount of depression of the brake pedal, and a vehicle speed sensor 54 which outputs a signal corresponding to the vehicle speed.

As a result, the hybrid ECU 10 is fed with a shift position signal from the shift position sensor 50, an ignition signal from the ignition switch 51, an accelerator opening degree signal from the accelerator opening degree sensor 52, a brake pedal position signal from the brake pedal sensor 53, and a vehicle speed signal from the vehicle speed sensor 54, etc.

The engine ECU 11, the parking ECU 12, the motor ECU 13, the battery ECU 14, the brake ECU 15, and a GSI (Gear Shift Indicator)-ECU 16 (detailed later) are connected to the input interface 44 and the output interface 45. The hybrid ECU 10 sends and receives various control signals and data to and from the ECUs 11 to 16.

Driving Force Transfer in Hybrid System

In the hybrid vehicle 1 configured as above, the torque (required torque) to be output to the front wheels (drive wheels) 6a and 6b is calculated based on the accelerator opening degree Acc which corresponds to the amount of depression of the accelerator pedal pressed down by the driver and on the vehicle speed V, in order to control the operation of the engine 2 and the motor generators MG1 and MG2 in such a manner that the vehicle can run with a required driving force which corresponds to the required torque. Specifically, when the required driving force is relatively low, the second motor generator MG2 is used to obtain the required driving force to reduce fuel consumption. On the other hand, when the required driving force is relatively high, the engine 2, as well as the second motor generator MG2, is used to obtain the required driving force by combining the driving forces from these driving force sources (travel force sources).

More specifically, when the vehicle is starting from a stop or travelling at low speed (therefore the engine 2 could operate only at low efficiency), the vehicle is powered only by the second motor generator MG2 (hereinafter, "EV travel"). EV travel also takes place when the driver selects EV travel mode on a travel mode selector switch disposed in the vehicle.

On the other hand, during regular travel, the driving force from the engine 2 is divided between two paths (torque split) by, for example, the power split mechanism 3. One portion of the driving force directly drives the drive wheels 6a and 6b (direct torque driving), and the other portion drives the first motor generator MG1 to generate electric power. The electric power thus generated drives the second motor generator MG2 to assist the driving of the drive wheels 6a and 6b (electric path driving). Consequently, the power split mechanism 3 functions as a differential mechanism, with most of the power from the engine 2 being mechanically transferred to the drive wheels 6a and 6b via the differential operation and the rest of the power from the engine 2 being electrically transferred via the electric path from the first motor generator MG1 to the second motor generator MG2. Continuously variable electric transmission is hence implemented where the gear ratio is electrically altered. Accordingly, the rotational speed and torque of the engine is freely manipulatable without relying on the rotational speed or torque of the drive wheels 6a and 6b (ring gear shaft 3e). The engine 2 can operate at an optimal fuel consumption rate while simultaneously delivering the driving force as required by the drive wheels 6a and 6b.

During high speed travel, the electric power from the battery 24 is also supplied to the second motor generator MG2 so as to increase the output of the second motor generator MG2 to deliver an additional driving force to the drive wheels 6a and 6b (providing auxiliary driving force to move the vehicle).

When reducing the vehicle speed, the second motor generator MG2 functions as an electric power generator for electric power regeneration, and the recovered electric power is saved in the battery 24. If the battery 24 is running out of charge and especially needs to be recharged, the output of the engine 2 is increased, and the electric power generation by the first motor generator MG1 is increased, so as to increase the charge in the battery 24. There are of course some cases where control is implemented by which the engine 2 is driven further, if necessary, during low speed travel. Examples of such cases include when the battery 24 needs charging as mentioned above, when an air conditioner or like accessories is driven, when the temperature of cooling water for the engine 2 is to be increased to a predetermined temperature, and when the vehicle accelerates rapidly.

In the hybrid vehicle, the engine 2 may be stopped to improve fuel efficiency, depending on the operation state of the vehicle, the state of the battery 24, and other conditions. The operation state of the vehicle and the state of the battery 24 are monitored, and the engine 2 is subsequently restarted. In this manner, in the hybrid vehicle, the engine 2 is operated intermittently even when the ignition switch is ON. Therefore, when the gear shift device 9 is in the parking position (P position) and the parking lock mechanism 8 is in the lock state (the parking lock pole 8b is in mesh with the parking gear 8a), the engine 2 may be started if, for example, there is a request for interior air heating or a need to charge the battery 24.

Basic Control in Manual Gear Shift Mode

Basic control of the hybrid system in the aforementioned manual gear shift mode will be described below.

Figure 3:
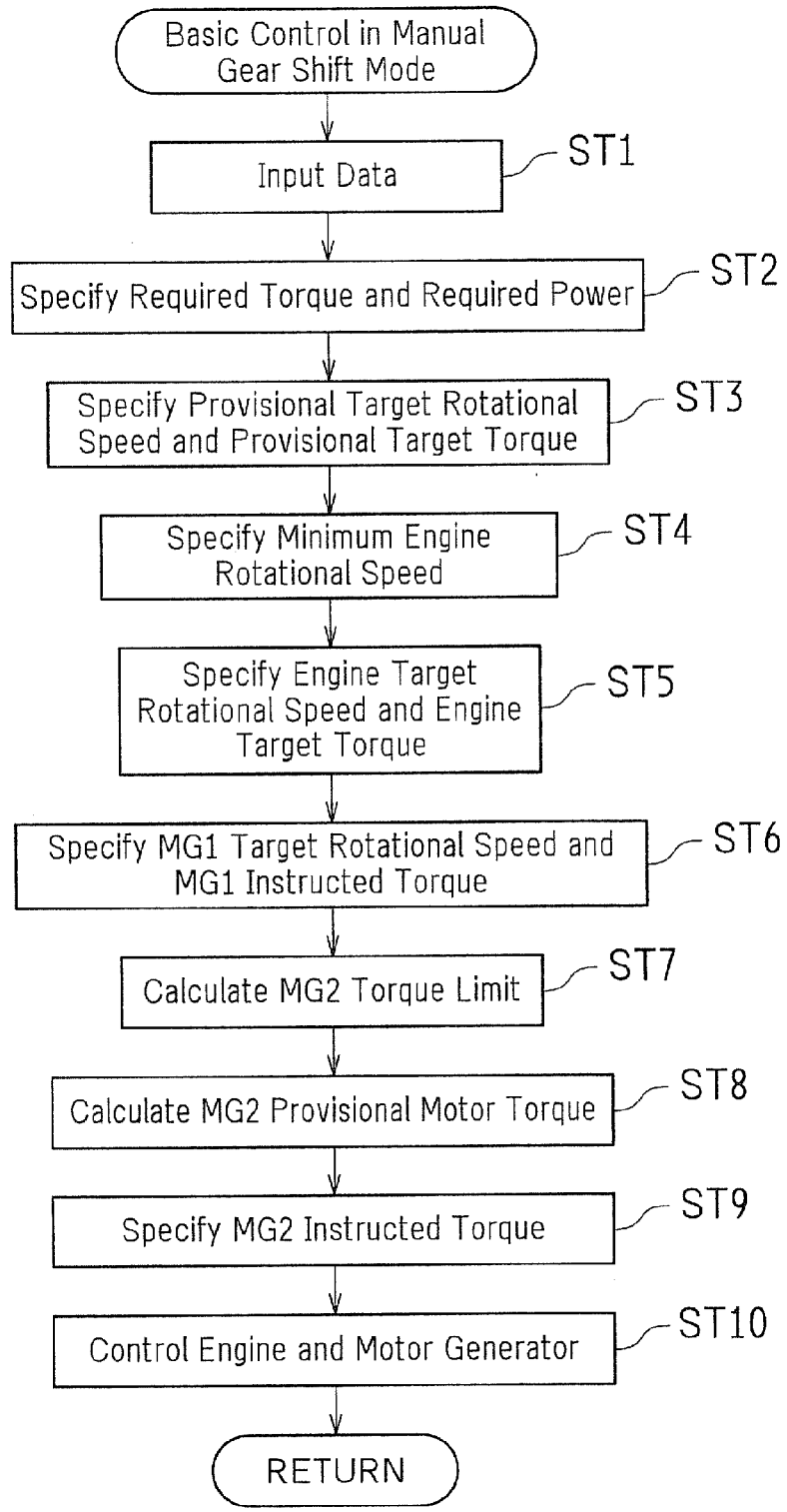
FIG. 3 is a flow chart depicting a basic control process in manual gear shift mode.

FIG. 3 is a flow chart depicting a basic control process in the manual gear shift mode carried out by the hybrid ECU 10 when the driver has manipulated the shift lever to sequential position (S) and presses down the accelerator. The process shown in the flow chart is repeatedly carried out at a predetermined time interval (e.g., every few milliseconds).

First, in step ST1, data required for the control is input: the shift position obtained from the output signal from the shift position sensor 50 (the shift position being selected in the manual gear shift mode; hereinafter, may be referred to as the "shift position SP"); the accelerator opening degree Acc determined from the output signal from the accelerator opening degree sensor 52; the vehicle speed V determined from the output signal from the vehicle speed sensor 54; the rotational speeds Nm1 and Nm2 of the motor generators MG1 and MG2 determined from the output signal from the rotational position sensors 26 and 27; the required charge/discharge power Pb; an input limit Win and an output limit Wout which represent the electric power allowed in the charging and discharging of the battery 24.

The information on the rotational speeds Nm1 and Nm2 of the motor generators MG1 and MG2 is supplied from the motor ECU 13 to the hybrid ECU 10. The settings for the required charge/discharge power Pb, with which the battery 24 should be charged and discharged, are specified by the battery ECU 14 based on the remaining electric power SOC of the battery 24 and other data, and supplied from the battery ECU 14 to the hybrid ECU 10. The settings for the input limit Win, representing allowable charging power which may be used for charging the battery 24, and the output limit Wout, representing allowable discharging power which may be used for discharging the battery 24, are specified based on the battery temperature Tb detected by the battery temperature sensor 24c and the remaining electric power SOC of the battery 24, and supplied from the battery ECU 14 to the hybrid ECU 10.

After the data input processing in step ST1, the process proceeds to step ST2 where the required torque Tr to be output to the ring gear shaft 3e is specified based on the inputs of the shift position SP, the accelerator opening degree Acc, and the vehicle speed V, and thereafter the power Pe required by the engine 2 is specified.

Figure 4:
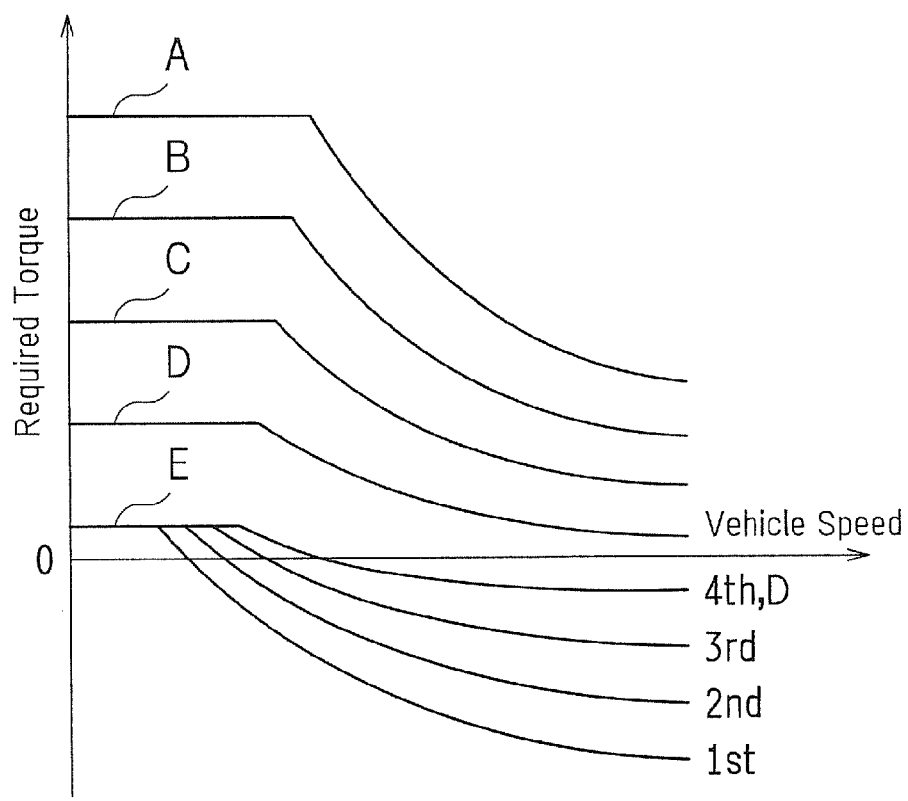
FIG. 4 is a diagram showing a required torque setting map.

In the present embodiment, a required torque setting map in which the relationship between the shift position SP, the accelerator opening degree Acc, the vehicle speed V, and the required torque Tr is predetermined is stored in the ROM 41. A required torque Tr which corresponds to the shift position SP, the accelerator opening degree Acc, and the vehicle speed V is extracted by referring to the required torque setting map. FIG. 4 shows an example of the required torque setting map. The accelerator opening degree Acc in the required torque setting map shown in FIG. 4 is 100% for A, 75% for B, 50% for C, and 25% for D. E in the figure represents cases where the accelerator opening degree Acc is relatively small (e.g., when the engine 2 is in non-driven state during a steady-state driving) or 0%.

The required torque setting map shown as an example in FIG. 4 is prepared so that when the accelerator opening degree Acc is relatively large, a required torque Tr suited for the accelerator opening degree Acc and the vehicle speed V can be specified under the same restrictions (under which to determine the required torque Tr) no matter which of the D and first to fourth positions the shift position SP is. Meanwhile, the required torque setting map is prepared so that when the accelerator opening degree Acc is relatively small or 0% (the accelerator is off), a required torque Tr suited for the accelerator opening degree Ace and the vehicle speed V can be specified under different restrictions for each of the first to fourth positions (except for a case when either the drive position (D) or the fourth position is being selected in the map of FIG. 4, where a required torque Tr is specified under the same restrictions). That is, when the accelerator opening degree Ace is relatively small or 0% in the hybrid vehicle 1 of the present embodiment, different required torque setting restrictions (required driving force setting restrictions) are associated to each of the first to fourth positions. Specifically, when the vehicle speed V is greater than or equal to a predetermined value, the negative required torque (which works as engine brake) grows with a lower gear (the lower the gear (hence, the greater the gear ratio), the greater the negative required torque).

The required power Pe is calculated as a sum of (i) a product of the required torque Tr determined from the required torque setting map and the rotational speed Nr of the ring gear shaft 3*e*, (ii) the required charge/discharge power Pb (the requirement to discharge being positive), and (iii) loss Loss.

Figure 5:
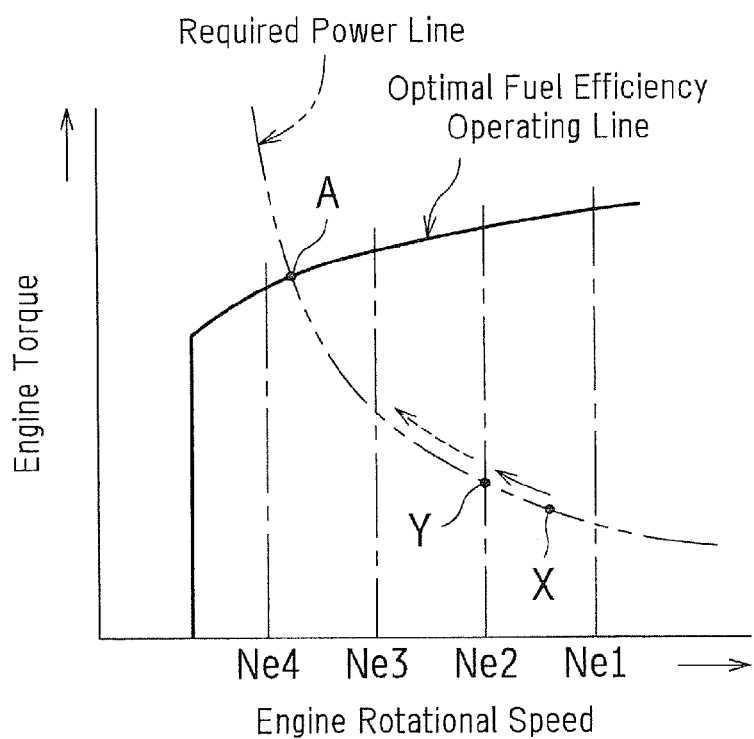
FIG. 5 is a diagram showing an example of an optimal fuel efficiency operating line and a required power line for an engine.

Next, the process proceeds to step ST3 where a provisional target rotational speed Netmp and a provisional target torque Tetmp, which give a provisional target operating point (operating point) for the engine 2, are specified based on the required power Pe specified in step ST2. In the present embodiment, the provisional target rotational speed Netmp and the provisional target torque Tetmp for the engine 2 are specified based on an operating line predetermined as a setting restrictions on a normal travel operating point so as to efficiently operate the engine 2 (hereinafter, may be referred to as an "optimal fuel efficiency operating line") and on the required power Pe. FIG. 5 illustrates, as an example, an optimal fuel efficiency operating line for the engine 2 and a correlation curve (required power line) for the rotational speed Ne and the torque Te. FIG. 5 shows that the provisional target rotational speed Netmp and the provisional target torque Tetmp can be determined as an intersection (point A in the figure) of the optimal fuel efficiency operating line and the correlation curve (required power line) which indicates that the required power Pe (Ne×Te) is constant.

After the provisional target rotational speed Netmp for the engine 2 and the provisional target torque Tetmp are specified in this manner, the process proceeds to step ST4 where a minimum engine rotational speed Nemin, which is a minimum value of the rotational speed Ne of the engine 2, is specified based on the earlier input shift position SP and vehicle speed V.

Figure 6:
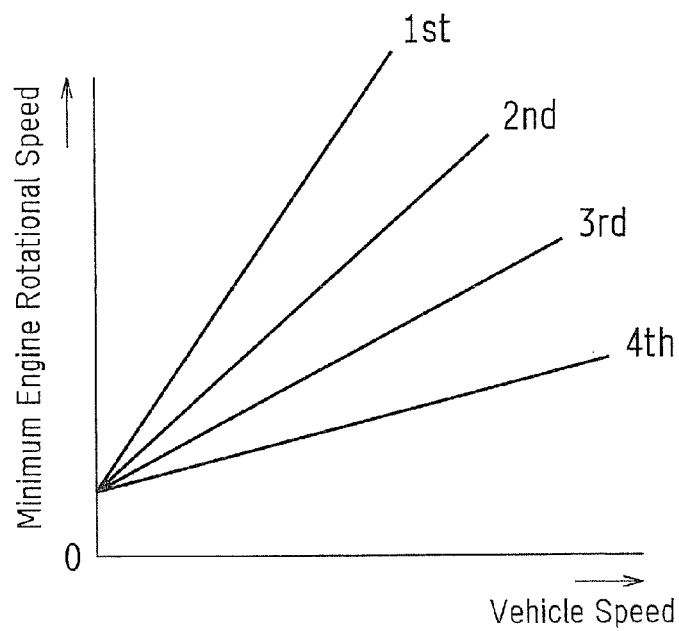
FIG. 6 is a diagram showing a minimum engine rotational speed setting map.
Figure 7:
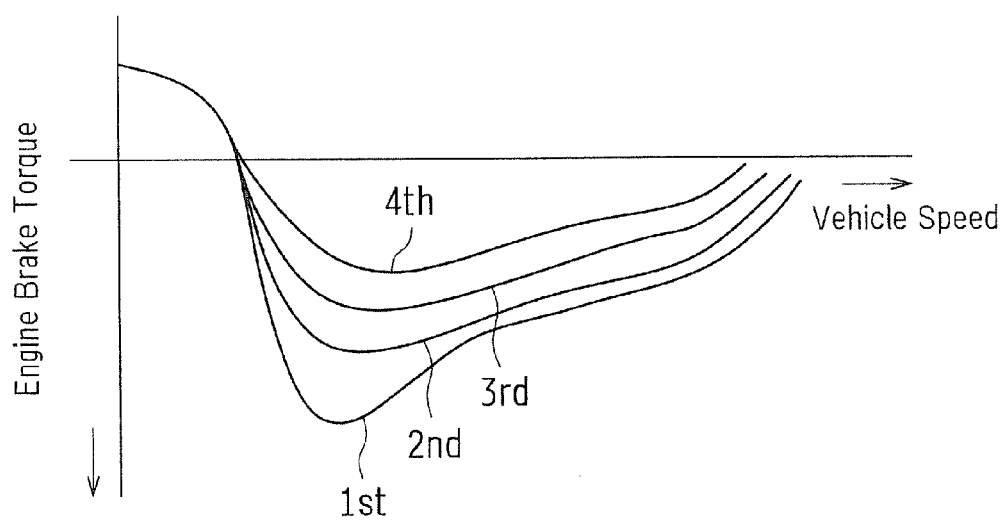
FIG. 7 is a diagram showing engine brake properties achieved in accordance with a vehicle speed and a selected gear.

In the hybrid vehicle 1 in accordance with the present embodiment, if the sequential position (S) is being selected as the shift position SP, the minimum engine rotational speed Nemin is predetermined in accordance with the vehicle speed V and the shift position SP (first to fourth). FIG. 6 is a minimum engine rotational speed setting map in which a relationship is predetermined between the shift position SP, the vehicle speed V (or the rotational speed of the ring gear shaft 3*e*), and the minimum engine rotational speed Nemin. The minimum engine rotational speed setting map is stored in the ROM 41. A minimum engine rotational speed Nemin which corresponds to the input vehicle speed V and shift position SP is extracted and specified from the map. That is, different operating point setting restrictions (target rotational speed setting restrictions) for the engine 2 are associated to each of the first to fourth shift positions. Specifically, the minimum engine rotational speed Nemin is set to a lower value for a higher gear shift position SP (as the position moves from the first to the fourth) for the same vehicle speed V. This is to, if the friction in the engine 2 is used so as to enable resistance to act as engine brake (braking force on the drive wheels 6*a* and 6*b*) when the accelerator opening degree Acc is small or when the accelerator is off, produce sufficient braking force by progressively restricting decreases in the rotational speed of the engine with lower gears in order to simulate an engine brake that is equivalent to the engine brake on a vehicle equipped with a manual transmission. This specification of the minimum engine rotational speed Nemin enables a greater engine brake torque to be obtained for lower gears (hence, larger gear ratios) even for the same vehicle speed (that is greater than or equal to a predetermined vehicle speed) and even when the magnitude of the engine brake torque (torque which acts as braking force on the drive wheels 6*a* and 6*b*) varies with the gear shifting and vehicle speed as illustrated in FIG. 7.

After the minimum engine rotational speed Nemin is specified in this manner, the process proceeds to step ST5 where the target rotational speed Ne for the engine 2 is set to the provisional target rotational speed Netmp or the minimum engine rotational speed Nemin, whichever is greater. The target torque Te for the engine 2 is specified by dividing the required power Pe specified in step ST2 by the target rotational speed Ne.

Thereafter, the process proceeds to step ST6 where the target rotational speed Nm1 for the first motor generator MG1 is calculated using the earlier specified target rotational speed Ne, the rotational speed Nr of the ring gear shaft 3*e*, and the gear ratio ρ (tooth count of ring gear 3*b*/tooth count of sun gear 3*a*) of the power split mechanism 3. Subsequently, an instructed torque Tm1 for the first motor generator MG1 is specified based on the calculated target rotational speed Nm1 and the current rotational speed Nm1.

After the instructed torque Tm1 for the first motor generator MG1 is specified in this manner, the process proceeds to step ST7 where torque limits Tmin and Tmax (minimum and maximum torques which may be output from the second motor generator MG2) are calculated by dividing the deviation between the input/output limits Win and Wout for the battery 24 and the power consumption (power generation) by the first motor generator MG1, obtained as a product of instructed torque Tm1 and the rotational speed Nm1 of the current the first motor generator MG1, by the rotational speed Nm2 of the second motor generator MG2.

Next, in step ST8, a provisional motor torque Tm2tmp to be output from the second motor generator MG2 is calculated based on the required torque Tr, the instructed torque Tm1, the gear ratio ρ of the power split mechanism 3, and the gear ratio Gr of the reduction mechanism 7. Then, in step ST9, the instructed torque Tm2 for the second motor generator MG2 is set to a value obtained by restricting the provisional motor torque Tm2tmp by the torque limits Tmin and Tmax calculated in step ST7. This setting of the instructed torque Tm2 for the second motor generator MG2 enables the torque to be output to the ring gear shaft 3e to be specified as the torque restricted within the range of the input/output limits Win and Wout of the battery 24.

After the target rotational speed Ne and the target torque Te for the engine 2 and the instructed torques Tm1 and Tm2 for the motor generators MG1 and MG2 are specified in this manner, the process proceeds to step ST10 where the target rotational speed Ne and the target torque Te of the engine 2 are sent to the engine ECU 11, and the instructed torques Tm1 and Tm2 of the motor generators MG1 and MG2 are sent to the motor ECU 13 to control the engine 2 and the motor generators MG1 and MG2. Upon receiving the target rotational speed Ne and the target torque Te, the engine ECU 11 carries out engine control (fuel injection control, ignition control, intake air volume adjustment control, etc.) to achieve the target rotational speed Ne and the target torque Te. The motor ECU 13, upon receiving the instructed torques Tm1 and Tm2, controls the switching of switching elements for the inverters 21 and 22 so that the first motor generator MG1 is driven by the instructed torque Tm1 and the second motor generator MG2 is driven by the instructed torque Tm2.

By repeating the process detailed above, in the hybrid vehicle 1, the required torque Tr, the target operating point (target rotational speed Ne and target torque Te) for the engine 2, etc. are set based on the shift position SP (first to fourth) when the S position is being selected as the shift position SP (when the manual gear shift mode is being selected). Subsequently, the engine 2 and the motor generators MG1 and MG2 are controlled so that a torque which corresponds to the required torque Tr is output to the ring gear shaft 3e. That control enables good response to the driver's acceleration/deceleration request for the vehicle.

Gear Shift Indication Device

The hybrid vehicle 1 in accordance with the present embodiment is provided with a gear shift indication device which, in the manual gear shift mode, instructs the driver to shift gears. The following will describe the gear shift indication device.

Figure 8:
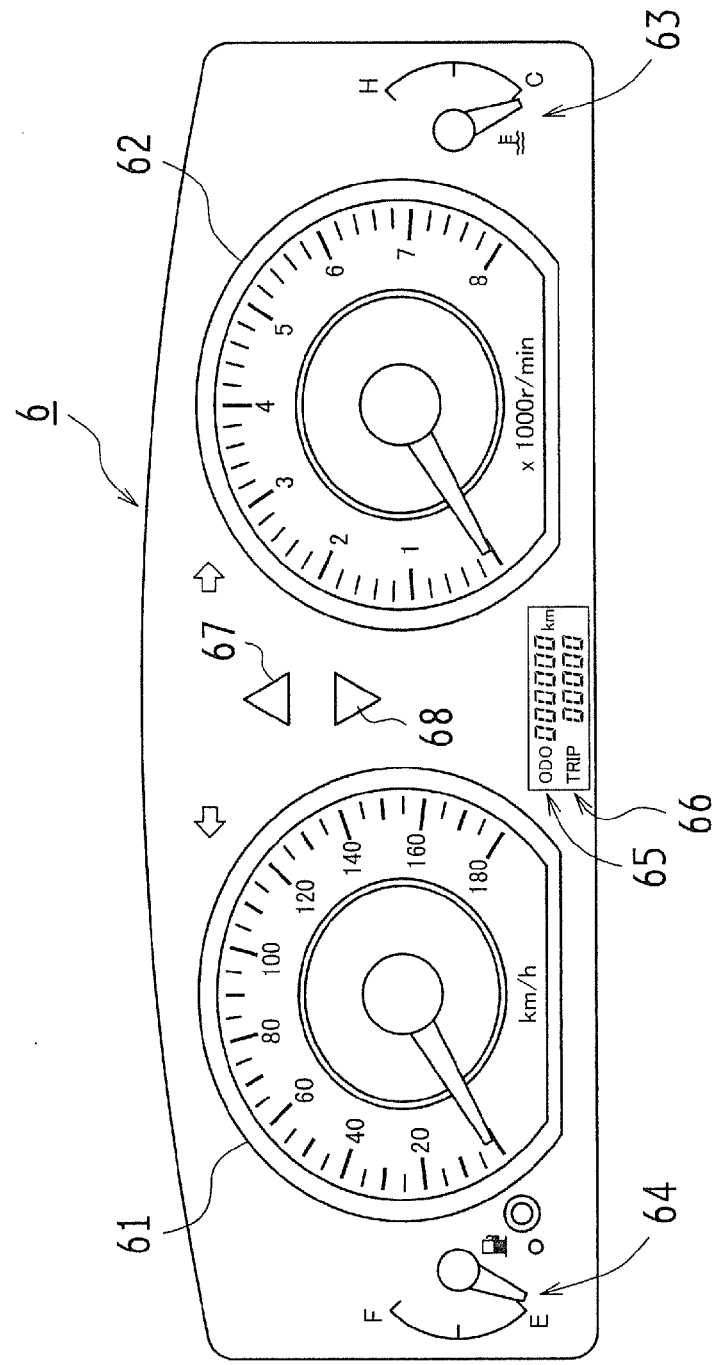
FIG. 8 is a diagram showing a combination meter assembly.

As illustrated in FIG. 8, a combination meter assembly 6, disposed in front of the driver's seat in the vehicle, contains, for example, a speedometer 61, a tachometer 62, a water temperature gauge 63, a fuel gauge 64, an odometer 65, a trip meter 66, and various warning indicator lamps.

The combination meter assembly 6 contains a gear shift indication device which instructs for a selection of a gear (gear position) suitable for improved fuel efficiency according to the vehicle's running conditions. The following will describe the gear shift indication device.

The combination meter assembly 6 has an upshift lamp 67 and a downshift lamp 68 as a display section for gear shift instructions. The upshift lamp 67 turns on when instructing to move to a next higher gear. The downshift lamp 68 turns on when instructing to move to a next lower gear. The upshift lamp 67 and the downshift lamp 68 are made of, for example, an LED and turned on/off under the control of the GSI-ECU 16. The upshift lamp 67, the downshift lamp 68, the GSI-ECU 16, and the hybrid ECU 10 form the gear shift indication device of the present invention. The GSI-ECU 16 may be omitted. In that case, the upshift lamp 67 and the downshift lamp 68 may be turned on/off under the control of the engine ECU 11 or a power management ECU (not shown).

A basic operation of the gear shift indication device in gear shift instruction control will be described. The ROM 41 contains a map in which a plurality of regions are set up so that an optimal gear (target gear) for fuel efficiency improvement can be determined according to the vehicle speed V and the accelerator opening degree Acc, using the vehicle speed V and the accelerator opening degree Acc as parameters.

The basic gear shift instruction control performed by the gear shift indication device detects, using the shift position sensor 50, the gear position being selected through a shift lever manipulation by the driver in the manual gear shift mode and compares the detected gear position (current gear position) with the gear position determined according to the map. If these gear positions match and are suitable, the GSI-ECU 16 turns off both the upshift lamp 67 and the downshift lamp 68 upon receiving a GSI control signal from the hybrid ECU 10.

Figure 9:
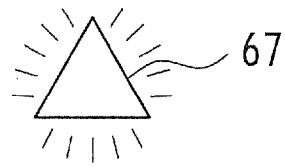
FIG. 9 is a diagram showing ON/OFF states of an upshift lamp and a downshift lamp, FIG. 9(a) showing an upshift instruction and FIG. 9(b) showing a downshift instruction.
Figure 9:
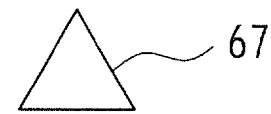
Figure 9:
Figure 9:
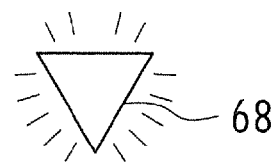

Meanwhile, if the detected gear position (current gear position) is lower than the gear position determined according to the map (if gear shift instruction conditions (upshift instruction conditions) are met), the GSI-ECU 16 turns on only the upshift lamp 67, as illustrated in FIG. 9(a), upon receiving a GSI control signal (upshift instruction signal) from the hybrid ECU 10. On the other hand, if the detected gear position (current gear position) is higher than the gear position determined according to the map (if gear shift instruction conditions (downshift instruction conditions) are met), the GSI-ECU 16 turns on only the downshift lamp 68, as illustrated in FIG. 9(b), upon receiving a GSI control signal (downshift instruction signal) from the hybrid ECU 10.

Gear Shift Instruction Control

Next will be described gear shift instruction control which is a feature operation of the present embodiment. When the predetermined upshift instruction conditions are met, the gear shift instruction control instructs for an upshift (turns on the upshift lamp 67) irrespective of the aforementioned basic gear shift instruction control. The upshift instruction conditions are, specifically, either the actual rotational speed Ne of the engine having decreased to the minimum engine rotational speed Nemin or the actual rotational speed Ne of the engine having so decreased that the deviation of the rotational speed Ne of the engine from the minimum engine rotational speed Nemin is less than or equal to a predetermined value (e.g., the deviation is less than or equal to 100 rpm) (which corresponds to "if the driving force source will likely have a rotational speed decreasing below the current minimum rotational speed" in the present invention). When the conditions are met, the gear shift indication device instructs for an upshift (turns on the upshift lamp 67). This is by no means limiting the value of the deviation which may be suitably specified. The following will describe more specific details.

Figure 10:
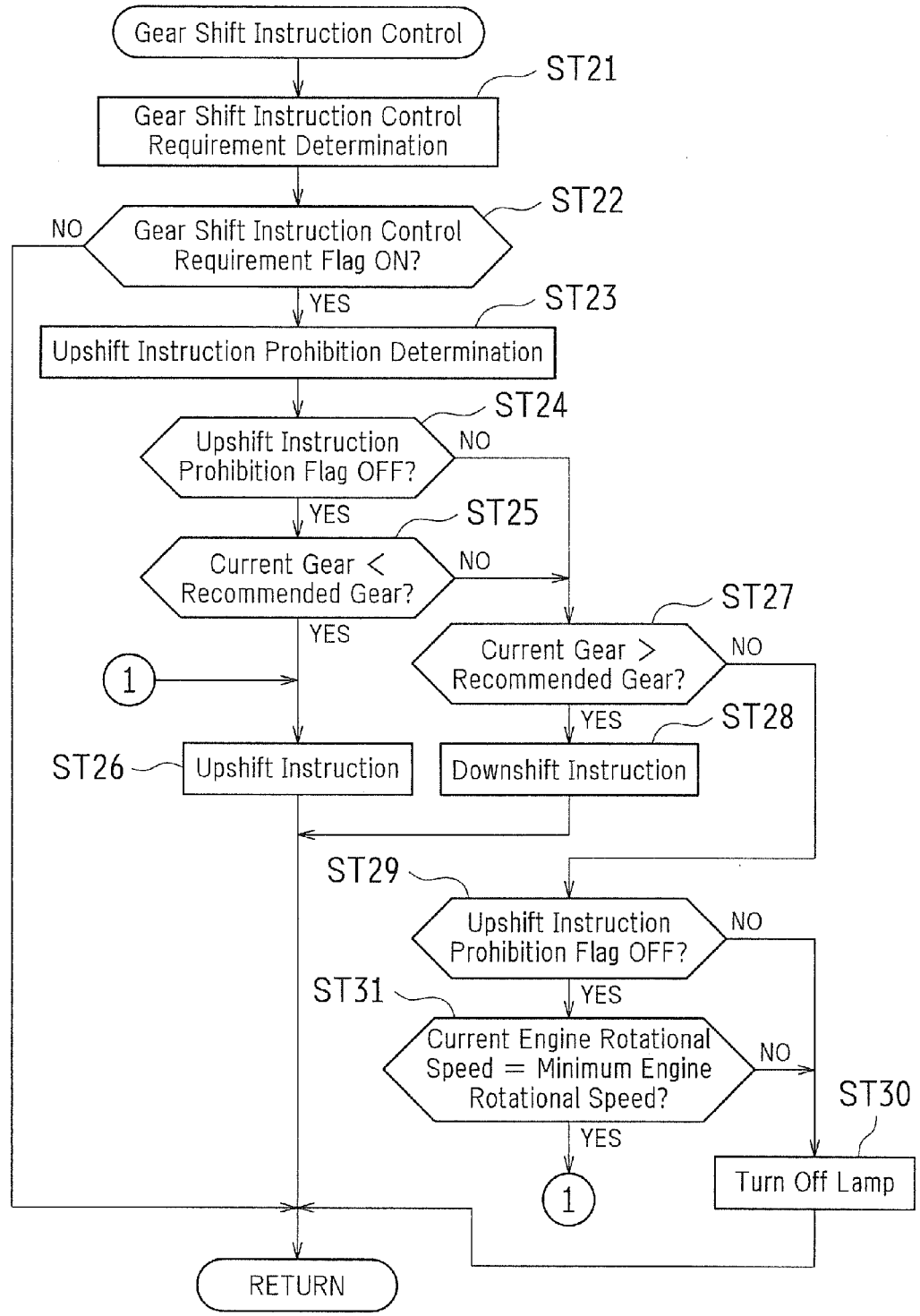
FIG. 10 is a flow chart depicting a gear shift instruction control process.

FIG. 10 is a flow chart depicting a gear shift instruction control process. The flow chart is repeatedly carried out at a predetermined interval (e.g., every few milliseconds). The flow chart will be described assuming that the upshift instruction conditions are met when the actual rotational speed Ne of the engine has decreased to the minimum engine rotational speed Nemin (the actual rotational speed Ne of the engine matches the minimum engine rotational speed Nemin).

First, in step ST21, it is determined whether there is a need to carry out the gear shift instruction control. One of conditions for that determination is that the shift lever of the gear shift device 9 is in the sequential position (S). In other words, if the position of the shift lever detected by the shift position sensor 50 is the sequential position (S), it is determined that the gear shift instruction control needs to be carried out, and a gear shift instruction control requirement flag is turned on.

After it is determined whether there is a need to carry out the gear shift instruction control, the process proceeds to step ST22 where it is determined whether the gear shift instruction control requirement flag is ON, that is, whether it is determined that there is a need to carry out the gear shift instruction control.

If the gear shift instruction control requirement flag is OFF, that is, if it is determined that there is no need to carry out the gear shift instruction control, because the shift lever of the gear shift device 9 is in the drive position (D) for example, step ST22 yields a NO (there is no need to carry out the gear shift instruction control), and the process proceeds straight away to the Return step.

Meanwhile, if the gear shift instruction control requirement flag is ON, that is, if it is determined that there is a need to carry out the gear shift instruction control, the process proceeds to step ST23 where an upshift instruction prohibition determination is carried out. The upshift instruction prohibition determination is carried out for the purpose of preventing an upshift operation which leads to a decrease in the rotational speed of the engine from being carried out in situations listed below in which there is a need to maintain a high rotational speed of the engine (situations where a control in which there is a need to maintain a high rotational speed of the engine (high rotational speed control in the present invention) is being carried out (hereinafter, the rotational speed needed in this control will be referred to as the "required engine rotational speed")), hence preventing failure to achieve the required engine rotational speed. Specifically, if the rotational speed of the engine, rotating at the current rotational speed (rotational speed of the engine before upshifting), will likely be below the required engine rotational speed upon shifting to a higher gear (upshifting), an upshift instruction prohibition flag is turned on to prohibit an upshift instruction.

After the upshift instruction prohibition determination, the process proceeds to step ST24 where it is determined whether the upshift instruction prohibition flag is OFF, that is, it is determined whether a control in which the required engine rotational speed is specified is not being carried out or whether even when that control is being carried out, the rotational speed of the engine upon upshifting will likely not be below the required engine rotational speed.

If it is determined that the upshift instruction prohibition flag is OFF, that is, if step ST24 yields a YES (if upshifting is allowed), the process proceeds to step ST25 where a comparison is made between the current gear position being selected manually on the gear shift device 9 (hereinafter, will be referred to as the "current gear") and a recommended gear determined from the current vehicle speed and accelerator opening degree so as to determine whether the current gear is lower, hence have a higher gear ratio, than the recommended gear (current gear<recommended gear). The recommended gear is, for example, specified as the gear where the gear ratio corresponding to the gear ratio (determined from the vehicle speed and the accelerator opening degree) specified in the automatic gear shift mode is obtained.

If step ST25 yields a YES (if the current gear is lower than the recommended gear), the process proceeds to step ST26 where the hybrid ECU 10 sends to the GSI-ECU 16 a control signal for giving an upshift instruction so that the GSI-ECU 16 turns on the upshift lamp 67. If the driver manipulates the shift lever to the "+" position or manipulates the upshift paddle switch 9c in response to the ON upshift lamp 67, the upshift operation is carried out in the hybrid system.

Meanwhile, if the upshift instruction prohibition flag is ON, that is, either if upshifting is prohibited in step ST24 or if the current gear is not lower than the recommended gear in step ST25, the process proceeds to step ST27 where a comparison is made between the current gear position being selected manually on the gear shift device 9 and a recommended gear determined from the current vehicle speed and accelerator opening degree so as to determine whether the current gear is higher, hence have a lower gear ratio, than the recommended gear (current gear>recommended gear).

If step ST27 yields a YES (if the current gear is higher than the recommended gear), the process proceeds to step ST28 where the hybrid ECU 10 sends to the GSI-ECU 16 a control signal for giving a downshift instruction so that the GSI-ECU 16 turns on the downshift lamp 68. If the driver manipulates the shift lever to the "−" position or manipulates the downshift paddle switch 9d in response to the ON downshift lamp 68, the downshift operation is carried out in the hybrid system.

If the current gear is not higher than the recommended gear in step ST27, step ST27 yields a NO, and the process proceeds to step ST29 where it is determined whether the upshift instruction prohibition flag is OFF.

If the upshift instruction prohibition flag is ON, that is, if the rotational speed of the engine upon upshifting will likely be below the required engine rotational speed, the process proceeds to step ST30 where the hybrid ECU 10 sends to the GSI-ECU 16 a control signal prohibiting both the upshift instruction and the downshift instruction. The GSI-ECU 16 turns off both the upshift lamp 67 and the downshift lamp 68. In other words, it is determined that a suitable gear is being specified, and no gear shift instruction operation is carried out.

On the other hand, if the upshift instruction prohibition flag is OFF, that is, either if no control in which the required engine rotational speed is specified is being carried out or if even when the control is being carried out, the rotational speed of the engine upon upshifting will likely not be below the required engine rotational speed, the process proceeds to step ST31 where it is determined whether the current rotational speed of the engine has decreased to the minimum engine rotational speed Nemin.

If step ST31 yields a NO (if the current rotational speed of the engine has not decreased to the minimum engine rotational speed Nemin yet), the process proceeds to step ST30 where both the upshift lamp 67 and the downshift lamp 68 are turned off.

Step ST31 yields a NO also if the current rotational speed of the engine is lower than the rotational speed of the engine given as the intersection of the optimal fuel efficiency operating line and the required power line. The process then proceeds to step ST30 where both the upshift lamp 67 and the downshift lamp 68 are turned off.

Meanwhile, when the upshift instruction prohibition flag is OFF, if the current rotational speed of the engine has decreased to the minimum engine rotational speed Nemin, and step ST31 yields a YES, the process proceeds to step ST26 where the hybrid ECU 10 sends to the GSI-ECU 16 a control signal for giving an upshift instruction so that the GSI-ECU 16 turns on the upshift lamp 67. This operation corresponds, in the present invention, to, in realizing a driving force required by the driver, the prompting of the driver to shift to a gear which allows for a minimum rotational speed lower than the current minimum rotational speed if there is less fuel consumption at a rotational speed lower than a current minimum rotational speed for the driving force source.

If the driver manipulates the shift lever to the "+" position or manipulates the upshift paddle switch 9c in response to the ON upshift lamp 67, the upshift operation is carried out in the hybrid system.

A specific description will be given in reference to FIG. 5. Here, the minimum engine rotational speed for the first gear (first) is specified as Ne1 in the figure, the minimum engine rotational speed for the second gear (second) is specified as Net in the figure, the minimum engine rotational speed for the third gear (third) is specified as Ne3 in the figure, and the minimum engine rotational speed for the fourth gear (fourth) is specified as Ne4 in the figure (for cases where the vehicle speed is constant).

Currently, the second gear (second) is being selected, and the operating point of the engine 2 is X in the figure. When the rotational speed of the engine has decreased (along the required power line), and the rotational speed of the engine has reached Ne2 in the figure (operating point Y in the figure), the upshift lamp 67 is turned on to instruct the driver to shift to a higher gear. Then, when the third gear (third) is selected, for example, by the driver manipulating the shift lever to the "+" position, the hybrid system implements an upshift operation. Consequently, the minimum engine rotational speed decreases to the minimum rotational speed Ne3 for the third gear. That allows a decrease in the rotational speed of the engine, which in turn allows the operating point for the engine 2 to approach an optimal fuel efficiency operating line (see the broken line arrow in the figure).

Upshift Instruction Prohibition Conditions

Next, upshift instruction prohibition conditions will be described which are used in the upshift instruction prohibition determination in step ST23. In step ST23, the upshift instruction prohibition flag is turned on if at least one of the upshift instruction prohibition conditions listed below is met and the rotational speed of the engine upon upshifting will likely be below the required engine rotational speed. The upshift instruction prohibition conditions are listed in the next paragraph.

(a) Catalyst is being warmed up.

(b) Rotational speed of the engine is being increased to prevent NV.

(c) Rotational speed of the engine is being increased to prevent colliding sound.

(d) Engine is being stalled.

(e) Rotational speed of the engine is being increased to respond to request for interior air heating.

(f) Rotational speed of the engine is being increased due to restrictions on maximum allowable torque of engine.

(g) Rotational speed being restricted due to restrictions on maximum rotational speed for first motor generator MG1.

(h) Rotational speed being restricted in limp home mode.

(i) Rotational speed being restricted due to cooperative gear shift control.

(j) Rotational speed of the engine is being increased due to engine oil levels.

(k) Rotational speed of the engine is being increased due to insufficient output of engine.

The following will specifically describe the individual conditions.

(a) The target rotational speed for the engine 2 is set to a high value in order to facilitate activation of catalyst disposed in an exhaust system by elevating the temperature of the catalyst when, for example, the engine 2 is cold. Specifically, the ignition timing for the ignition plug is shifted to a retardation side, and to prevent resultant destabilization of combustion (to prevent unwanted noise, vibration, accidental fires, etc.), a high rotational speed is specified for the engine. If an upshift is carried out and the rotational speed of the engine is decreased in this situation, combustion is possibly destabilized. Upshift instructions are therefore prohibited.

(b) Unwanted noise and vibration in the engine 2 and the driving force transfer system are intense markedly at their resonance points. This is particularly true when the engine is cool. Therefore, upshift instructions are prohibited while the rotational speed of the engine is being maintained at a high level (e.g., the rotational speed of the engine is set according to the engine output and the vehicle speed) to prevent the resonance from causing increased unwanted noise or vibration.

(c) For example, in an operation state where the torque of the second motor generator MG2 is set to a low value, gear teeth in the reduction mechanism 7 are loosely engaged (e.g., backlash) and hence floating. Therefore, colliding sound may occur from repeated collisions of the tooth caused by variations of the rotation of the engine 2. This colliding sound is prevented by setting the rotational speed of the engine to a high level. Therefore, upshift instructions are prohibited in such an operation state to ensure prevention of colliding sound.

(d) While the driver is pressing and holding down both the accelerator pedal and the brake pedal, the rotational speed of the engine is set to a high value to maintain subsequent reacceleratability. Therefore, upshift instructions are prohibited in such an operation state to maintain a high rotational speed of the engine.

(e) The rotational speed of the engine 2, a heat source for air heating, is set to a high value in response to a request for interior air heating to ensure air heating capability. Therefore, upshift instructions are prohibited in such an operation state to maintain a high rotational speed of the engine.

(f) If the maximum allowable torque of the engine 2 is restricted (e.g., in favor of better protection of components), the required power needs to be satisfied by increasing the rotational speed of the engine. Therefore, upshift instructions are prohibited in such a situation to maintain a high rotational speed of the engine.

(g) The maximum rotational speed of the first motor generator MG1 is restricted during so-called reverse power running (e.g., when the vehicle is travelling at high speed with the first motor generator MG1 rotating in reverse at relatively high speed) in favor of better protection of components. When that is the case, the required driving force needs to be achieved by increasing the rotational speed of the engine. Therefore, upshift instructions are prohibited also in such a situation to maintain a high rotational speed of the engine.

(h) The required driving force also needs to be achieved by increasing the rotational speed of the engine in limp home mode, for example, when the motor does not operate properly. Therefore, upshift instructions are prohibited also in such a situation to maintain a high rotational speed of the engine.

(i) During so-called reverse power running, the second motor generator MG2 is operating in regenerative mode. A gear shift request in such a situation may lead to undesirable mechanical impact due to difficulty in gear shifting control. In an attempt to eliminate the negative torque from the second motor generator MG2 by decreasing the torque from the engine 2 and ultimately to reduce the mechanical impact, the negative torque of the second motor generator MG2 may not be eliminated due to the output limit Wout on the battery 24. When that is the case, an attempt to eliminate the negative torque should be made with the rotational speed of the engine being set to a high level. Therefore, upshift instructions are prohibited also in such a situation to maintain a high rotational speed of the engine.

(j) When engine oil levels are checked, for example, during servicing, the rotational speed of the engine needs to be greater than or equal to a certain value to ensure a constant oil pressure because the oil pressure in an oil pump varies with the rotational speed of the engine. Therefore, upshift instructions are prohibited also in such a situation to maintain a high rotational speed of the engine.

(k) If the rotational speed of the engine cannot be maintained due to an abnormality occurring during idling which follows a start of intermittent operation of the engine 2, the first motor generator MG1 is controlled so as to maintain a high rotational speed of the engine while waiting for the engine 2 to return to a normal state. Upshift instructions are prohibited in such a situation to maintain a high rotational speed of the engine.

As described above, when the upshift instruction prohibition conditions are not met in the present embodiment, the upshift lamp 67 is turned on to prompt the driver to shift to a higher gear if the rotational speed Ne of the engine has decreased to the minimum engine rotational speed Nemin. Accordingly, if the driver implements an upshift operation in response to the instruction, the minimum rotational speed Nemin of the engine 2 is lowered to allow the rotational speed of the engine 2 to fall. This means that the rotational speed of the engine 2 can be now lowered which was restricted under the gear being selected before the upshift operation. The engine 2 is thus able to be driven at an efficient rotational speed (at a rotational speed close to the optimal fuel efficiency operating line). As a result, the fuel consumption rate of the engine 2 is improved.

Modification Example 1

Next, modification example 1 will be described. According to the modification example, a recommended gear is extracted from a recommended gear setting map stored in the ROM 41.

Figure 11:
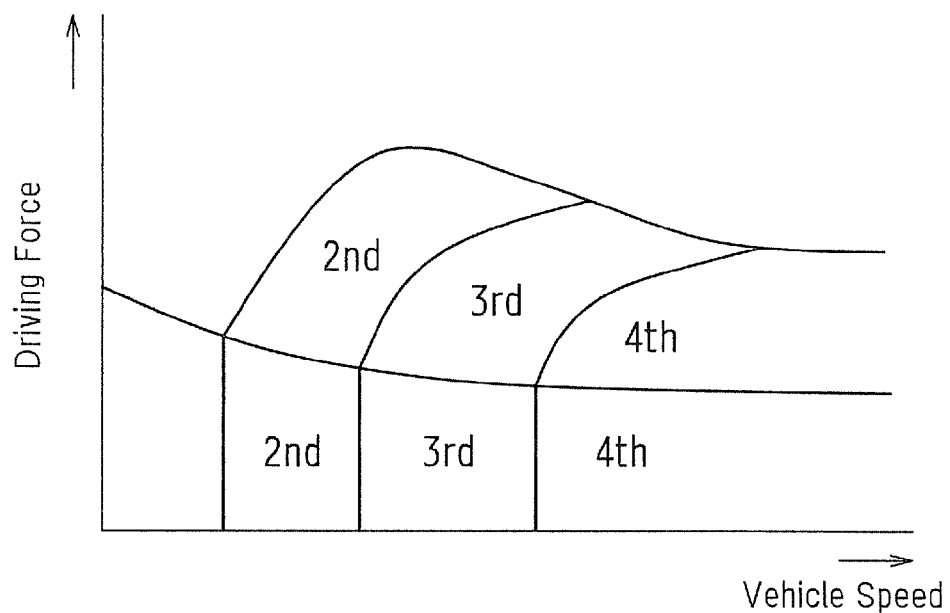
FIG. 11 is a diagram showing a recommended gear setting map in modification example 1.

FIG. 11 shows an example of a recommended gear setting map. The recommended gear setting map allows an optimal gear to be extracted from there according to the vehicle speed and required driving force. The recommended gear setting map is prepared through experiment or simulation so as to enable extraction of a gear under which the restrictions resulting from the minimum rotational speed can be avoided (the rotational speed of the engine is set to an unnecessarily high level due to the setting of the minimum rotational speed).

Therefore, the gear extracted from the recommended gear setting map is compared with the gear being selected in the manual gear shift mode (actual gear). If the actual gear is lower, the gear shift indication device instructs for upshifting (turns on the upshift lamp 67). An upshift instruction can thus be given before the rotational speed of the engine decreases to the minimum rotational speed.

Therefore, the present modification example achieves similar results to those achieved by the embodiment above. As the driver implements the upshift operation in response to the instruction, the minimum rotational speed Nemin of the engine 2 is lowered to allow the rotational speed of the engine 2 to fall. As a result, the fuel consumption rate of the engine 2 is improved.

Modification Example 2

Next, modification example 2 will be described. The modification example employs different upshift instruction prohibition conditions from those employed in the embodiment above. Since the current modification example is otherwise similar in configuration and control operation to the embodiment, the description will focus on upshift instruction prohibition conditions.

The upshift instruction prohibition conditions in the present modification example are met if the difference between the minimum rotational speed for the engine 2 specified for the pre-upshifting gear and the minimum rotational speed for the engine 2 specified for the post-upshifting gear (the gear which would be achieved by upshifting in response to an upshift instruction from the gear shift indication device) is less than or equal to a predetermined value. In other words, if the difference between the minimum rotational speed for the engine 2 for the current gear (which yields a predetermined gear ratio) and the minimum rotational speed for the engine 2 for the post-shifting gear (higher gear) which would be achieved in response to an instruction from the gear shift indication device is less than or equal to a predetermined value (e.g., less than or equal to 50 rpm), the gear shift indication device gives no upshift instruction.

In other words, if the difference between these minimum rotational speeds is less than or equal to a predetermined value, the gear shift indication device gives no upshift instruction (the upshift lamp 67 is not turned on) so that the upshift lamp 67 remains turned off, even when the current rotational speed Ne of the engine has decreased to the minimum engine rotational speed Nemin.

The gear shift indication device gives no upshift instruction under the circumstances detailed above for the following reasons. Even if upshifting was carried out in response to an upshift instruction, little improvement in fuel consumption rate could be expected to result from decreases in the rotational speed of the engine. The upshifting would only add to gear manipulation workload for the driver with no practical benefit. The need for the aforementioned engine brake is small, for example, under those gears whose gear ratios are relatively low (high gears). Therefore, there is specified only a small difference or in some cases no difference at all in minimum engine rotational speed Nemin between different gears. Upshift instructions to shift between such gears are prohibited.

Figure 12:
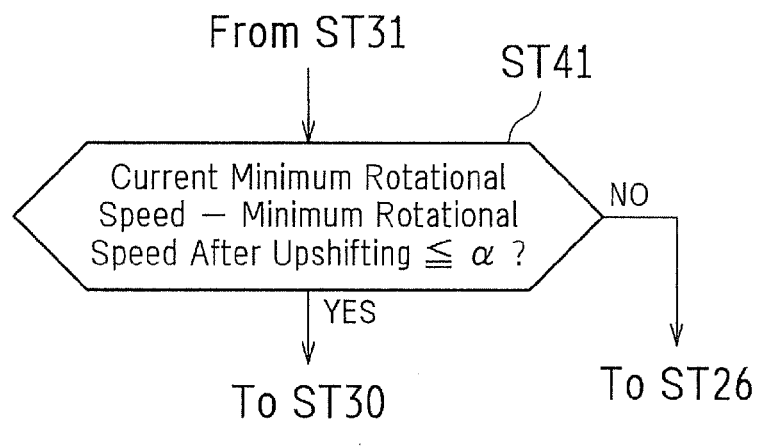
FIG. 12 is a flow chart depicting steps for a part of a gear shift instruction control process in modification example 2.

More specifically, step ST31 yields a YES in the flow chart shown in FIG. 10 in relation to the embodiment above. Step ST31 is followed by step ST41 in FIG. 12 where it is determined whether the difference between the minimum rotational speed (current minimum rotational speed) of the engine 2 under the current gear and the minimum rotational speed (post-upshifting minimum rotational speed) of the engine 2 under a next higher gear is less than or equal to a predetermined value α (e.g., less than or equal to 50 rpm). This is by no means limiting the value of the difference which may be suitably specified.

If the difference between the minimum rotational speeds is in excess of the predetermined value α, step ST41 yields a NO, and the process proceeds to step ST26 where the hybrid ECU sends to the GSI-ECU 16 a control signal for giving an upshift instruction so that the GSI-ECU 16 turns on the upshift lamp 67, because there will be a sufficient improvement in fuel consumption rate upon shifting to a higher gear.

On the other hand, if the difference between the minimum rotational speeds is less than or equal to the predetermined value α, step ST41 yields a YES, and the process proceeds to step ST30 where both the upshift lamp 67 and the downshift lamp 68 are turned off because there will not be a sufficient improvement in fuel consumption rate upon shifting to a higher gear. In other words, upshift instructions are prohibited.

The present modification example has so far assumed that step ST41 (where it is determined whether the difference between the current minimum rotational speed and the post-upshifting minimum rotational speed is less than or equal to a predetermined value α) is implemented if the upshift instruction prohibition flag is determined to be OFF in step ST29 in the flow chart of FIG. 10. Alternatively, the present modification example may skip step ST29.

Modification Example 3

Next, modification example 3 will be described. The modification example employs different upshift instruction prohibition conditions from those employed in the embodiment above and modification example 2. Since the current modification example is otherwise similar in configuration and control operation to the embodiment, the description will focus again on upshift instruction prohibition conditions.

The upshift instruction prohibition conditions in the present modification example are met if the battery temperature Tb detected by the battery temperature sensor 24*c* is less than or equal to a predetermined temperature. In other words, if the battery temperature Tb is less than or equal to a predetermined temperature, the gear shift indication device gives no upshift instruction (the upshift lamp 67 is not turned on) so that the upshift lamp 67 remains turned off, even when the current rotational speed Ne of the engine has decreased to the minimum engine rotational speed Nemin. The gear shift indication device gives no upshift instruction under such circumstances for the following reasons. If the battery temperature Tb is low, the maximum and minimum voltages of the battery 24 are restricted by rising internal resistance and other factors. Therefore, upshift instructions are prohibited to prevent excessive electric power caused by rotation variations of the motor generator which accompany the rotation variations of the engine 2.

Figure 13:
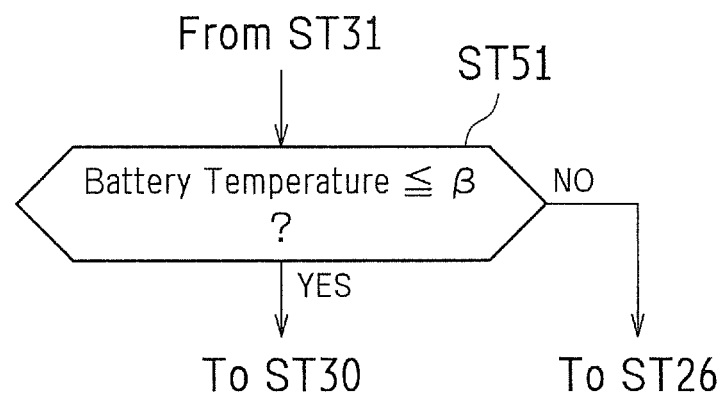
FIG. 13 is a flow chart depicting steps for a part of a gear shift instruction control process in modification example 3.

More specifically, step ST31 yields a YES in the flow chart shown in FIG. 10 in relation to the embodiment above. Step ST31 is followed by step ST51 shown in FIG. 13 where it is determined whether the battery temperature Tb is less than or equal to a predetermined temperature β (e.g., 0° C.). This is by no means limiting the value of the predetermined temperature which may be suitably specified.

If the battery temperature Tb is in excess of the predetermined temperature β, step ST51 yields a NO, and the process proceeds to step ST26 where the hybrid ECU sends to the GSI-ECU 16 a control signal for giving an upshift instruction so that the GSI-ECU 16 turns on the upshift lamp 67.

On the other hand, if the battery temperature Tb is less than or equal to the predetermined temperature β, step ST51 yields a YES, and the process proceeds to step ST30 where both the upshift lamp 67 and the downshift lamp 68 are turned off. In other words, upshift instructions are prohibited.

The present modification example has so far assumed that step ST51 (where it is determined whether the battery temperature Tb is less than or equal to the predetermined temperature β) is implemented if the upshift instruction prohibition flag is determined to be OFF in step ST29 in the flow chart of FIG. 10. Alternatively, the present modification example may skip step ST29.

Additional Embodiments

The embodiment and modification examples described above have assumed that the present invention is applied to control of FF (front engine, front wheel drive) hybrid vehicles as an example. The present invention is by no means limited to these applications. Alternatively, the present invention may be applied to control of FR (front engine, rear wheel drive) hybrid vehicles and four-wheel drive hybrid vehicles.

The embodiment and modification examples described above have assumed that the present invention is applied to control of hybrid vehicles equipped with two motor generators (the first motor generator MG1 and the second motor generator MG2) as an example. Alternatively, the present invention may be applied to control of hybrid vehicles equipped with a single motor generator and those equipped with three or more motor generators. The present invention is also applicable to electric cars equipped with a motor(s) as a driving force source. In the last case, the present invention is applied to control of an electric car in manual gear shift mode, the car being such that a minimum rotational speed is specified for the motor for each gear and friction in rotation of the motor is utilized to work as an engine brake.

The embodiment and modification examples described above have assumed that the upshift instruction prohibition flag is turned on to prohibit upshift instructions if upshifting will likely cause the rotational speed of the engine to fall below the required engine rotational speed during control (high rotational speed control) in which a high rotational speed of the engine needs to maintained. This is by no means limiting the present invention. Alternatively, the upshift instruction prohibition flag may be turned on in response to control (high rotational speed control) being carried out in which a high rotational speed of the engine needs to be maintained.

The present invention is also applicable to vehicles equipped with an automatic transmission capable of providing sequential shift mode and hybrid vehicles equipped with a series hybrid system. The present invention is also applicable to gear shift systems of range hold types (capable of automatic gear shifting from a selected gear to a lower gear) and of gear hold types (a selected gear is maintained). The range hold type here refers to control in which when the shift lever is in the sequential position (S), the hybrid ECU 10 designates the current gear as the highest possible gear and automatically shifts gears within a restricted range whose upper limit (minimum gear ratio) is defined by the highest possible gear. For example, if the third gear (third) is being selected in manual gear shift mode, automatic gear shifting is possible between the first gear (first), second gear (second), and third gear (third) with the third gear defining the upper limit.

In the embodiment above, the upshift lamp 67 is turned on to give an upshift instruction when the current rotational speed of the engine has decreased to the minimum engine rotational speed Nemin, This is by no means limiting the present invention. Alternatively, an upshift instruction may be given, within the scope of the technical concept of the present invention, if the current rotational speed of the engine will likely decrease below the minimum engine rotational speed Nemin. For example, it is determined, from the rate of decrease of the rotational speed of the engine 2, whether the rotational speed of the engine will likely decrease below the minimum engine rotational speed Nemin. Specifically, if the rate of decrease of the rotational speed of the engine 2 is greater than or equal to a predetermined value, it is determined that the rotational speed of the engine will likely decrease below the minimum engine rotational speed Nemin. Alternatively, it may be determined, from the relationship between the amount of depression of the accelerator pedal and the vehicle speed, whether the rotational speed of the engine will likely decrease below the minimum engine rotational speed Nemin.

INDUSTRIAL APPLICABILITY

The present invention is applicable to a gear shift indication device which instructs the driver to shift gears in a hybrid vehicle provided with a continuously variable electric transmission mechanism capable of providing sequential shift mode.

REFERENCE SIGNS LIST

1 Hybrid Vehicle
2 Engine (Driving Force Source, Internal Combustion Engine)
2a Crankshaft
3 Power Split Mechanism
3a Sun Gear
3b Ring Gear
3d Carrier
3e Ring Gear Shaft (Engine Output Shaft)
6a, 6b Front Wheel (Drive Wheel)
7 Reduction Mechanism
9 Gear Shift Device
10 Hybrid ECU
16 GSI-ECU
67 Upshift Lamp
68 Downshift Lamp
MG1 First Motor Generator (First Electric Motor)
MG2 Second Motor Generator (Second Electric Motor)

The invention claimed is:

1. A gear shift indication device for use in a vehicle having a driving force transfer system capable of transferring a driving force from a driving force source to drive wheels and capable of manual gear selection, the driving force source having a minimum rotational speed specified for each gear, and the vehicle being driven by a driver, the gear shift indication device comprising:
an electronic control unit configured to:
prompt the driver to shift gears;
determine if the driving force has a rotational speed decreasing below a current minimum rotational speed; and
prompt the driver to shift to a gear that allows for a minimum rotational speed lower than the current minimum rotational speed in response to the rotational speed of the driving force being determined as decreasing below the current minimum rotational speed.

2. The gear shift indication device as set forth in claim 1, wherein
the driving force transfer system is capable of shifting gears in automatic gear shift mode and manual gear shift mode, and
in the manual gear shift mode, if the electronic control unit determines that the driving force source will have a rotational speed decreasing below the current minimum rotational speed, the electronic control unit is configured to prompt the driver to shift to a gear which allows for a minimum rotational speed lower than the current minimum rotational speed.

3. The gear shift indication device as set forth in claim 2, wherein the driving force transfer system includes a continuously variable transmission mechanism capable of continuously variable gear ratio, and
the continuously variable transmission mechanism allows for switching between multiple gear ratios in the manual gear shift mode.

4. The gear shift indication device as set forth in claim 3, wherein
the driving force source is an internal combustion engine,
the driving force transfer system includes a power split mechanism comprising a planetary gear train including:
a planetary carrier connected to an output shaft of the internal combustion engine;
a sun gear connected to a first electric motor; and
a ring gear connected to a second electric motor, and
the driving force transfer system is capable of variable gear ratio by altering a rotational speed of the internal combustion engine through control of a rotational speed of the first electric motor.

5. The gear shift indication device as set forth in claim 1, wherein
if the rotational speed of the driving force source decreases to the minimum rotational speed or decreases such that a deviation of the rotational speed from the minimum rotational speed is less than or equal to a predetermined value, the electronic control unit determines that the driving force source will have a rotational speed decreasing below the current minimum rotational speed.

6. The gear shift indication device as set forth in claim 1, wherein
the electronic control unit is configured to not prompt the driver to shift gears if: (i) a high rotational speed control specified for the driving force source is being carried out, or (ii) upon shifting to a higher gear while the high rotational speed control is being carried out, the rotational speed of the driving force source will be below a required rotational speed for the driving force source under the high rotational speed control.

7. The gear shift indication device as set forth in claim 6, wherein
the high rotational speed control is configured to:
(a) in the case of the driving force source being an internal combustion engine, specify a high rotational speed for the internal combustion engine to warm up catalyst in an exhaust system;
(b) specify a high rotational speed for the driving force source to reduce unwanted noise and vibration in the driving force source or the driving force transfer system;
(c) specify a high rotational speed for the driving force source to reduce unwanted noise produced by gear teeth colliding with each other due to loose engagement of gear teeth in the driving force transfer system;
(d) specify a high rotational speed for the driving force source to maintain reacceleratability of the vehicle;
(e) specify a high rotational speed for the driving force source in response to a request for interior air heating;
(f) specify a high rotational speed for the driving force source in response to a restriction on a maximum allowable torque of the driving force source;
(g) in the case of the driving force source being an internal combustion engine and an electric motor, specify a high rotational speed for the internal combustion engine in response to a restriction on a maximum rotational speed of the electric motor;
(h) in the case of the driving force source being an internal combustion engine and an electric motor, specify a high rotational speed for the internal combustion engine in response to a malfunction of the electric motor;

(i) in the case of the driving force source being an internal combustion engine and a motor generator, specify a high rotational speed for the internal combustion engine for eliminating a negative torque occurring in the motor generator;

(j) in the case of the driving force source being an internal combustion engine, specify a high rotational speed for the internal combustion engine to maintain an oil pressure of engine oil by means of the driving force of the internal combustion engine; or (k) in the case of the driving force source being an internal combustion engine and an electric motor, transfer a rotational force of the electric motor to the internal combustion engine in response to an insufficient output of the internal combustion engine for adjusting the rotational speed of the internal combustion engine by means of the rotational force of the electric motor.

8. The gear shift indication device as set forth in claim 1, wherein if the electronic control unit determines that the driving force source will have a rotational speed decreasing below the current minimum rotational speed, the electronic control unit is configured to not prompt the driver to shift gears if a difference between the current minimum rotational speed and a minimum rotational speed for the driving force source for a gear to which the driver would shift if being prompted to do so is less than or equal to a predetermined value.

9. The gear shift indication device as set forth in claim 1, wherein the vehicle includes: (i) an electric power generator configured to receive a driving force from the driving force source for generation of electric power, and (ii) an electric storage device configured to store the electric power generated by the electric power generator, and when the electric storage device has a temperature below or equal to a predetermined value, the electronic control device does not prompt the driver to shift gears.

\* \* \* \* \*